US009413779B2

(12) United States Patent
Vasseur et al.

(10) Patent No.: US 9,413,779 B2
(45) Date of Patent: Aug. 9, 2016

(54) LEARNING MODEL SELECTION IN A DISTRIBUTED NETWORK

(71) Applicant: Cisco Technology, Inc., San Jose, CA (US)

(72) Inventors: Jean-Philippe Vasseur, Saint Martin d'Uriage (FR); Andrea Di Pietro, Lausanne (CH); Javier Cruz Mota, Assens (CH)

(73) Assignee: Cisco Technology, Inc., San Jose, CA (US)

( * ) Notice: Subject to any disclaimer, the term of this patent is extended or adjusted under 35 U.S.C. 154(b) by 224 days.

(21) Appl. No.: 14/164,443

(22) Filed: Jan. 27, 2014

(65) Prior Publication Data

US 2015/0193693 A1  Jul. 9, 2015

Related U.S. Application Data

(60) Provisional application No. 61/923,847, filed on Jan. 6, 2014.

(51) Int. Cl.
*G06N 3/08* (2006.01)
*H04L 29/06* (2006.01)
*G06N 99/00* (2010.01)
*H04L 12/26* (2006.01)
*G06N 3/02* (2006.01)
*H04L 12/24* (2006.01)
(Continued)

(52) U.S. Cl.
CPC .............. *H04L 63/1425* (2013.01); *G06N 3/02* (2013.01); *G06N 99/005* (2013.01); *H04L 41/16* (2013.01); *H04L 43/0876* (2013.01); *H04L 47/127* (2013.01); *H04L 47/2466* (2013.01); *H04L 47/41* (2013.01); *G06N 3/08* (2013.01); *H04L 45/48* (2013.01)

(58) Field of Classification Search
None
See application file for complete search history.

(56) References Cited

U.S. PATENT DOCUMENTS 7,526,806 B2   4/2009   Wiley et al.
7,603,709 B2   10/2009  Lewis et al.
(Continued)

FOREIGN PATENT DOCUMENTS

EP      2442525 A1      4/2012
WO      WO-02/48959 A2  6/2002

OTHER PUBLICATIONS

Su, et al., Adaptive Neural Network Predictive Control Based on PSO Algorithm, 2009 Chinese Control and Decision Conference (CCDC 2009), 2009, pp. 5829-5833.*
Smith, et al., Adaptive Teleoperation using Neural Network-Based Predictive Control, Proceedings of the 2005 IEEE Conference on Control Applications, 2005, pp. 1269-1274.*
Cai, et al., "Distributed Aggregation Algorithms with Load-Balancing for Scalable Grid Resource Monitoring", Parallel and Distributed Processing Symposium, Mar. 2007, 10 pages, Institute of Electical and Electronics Engineers.
Hwang, et al., "DHT-Based Security Infrastructure for Trusted Internet and Grid Computing", International Journal of Critical Infrastructures, vol. 2, No. 4, Nov. 2009, pp. 412-433, Inderscience Publishers.

(Continued)

*Primary Examiner* — Wilbert L Starks
(74) *Attorney, Agent, or Firm* — Parker Ibrahim & Berg LLC; James M. Behmke; Stephen D. LeBarron

(57) ABSTRACT

In one embodiment, local model parameters are generated by training a machine learning model at a device in a computer network using a local data set. One or more other devices in the network are identified that have trained machine learning models using remote data sets that are similar to the local data set. The local model parameters are provided to the one or more other devices to cause the one or more other devices to generate performance metrics using the provided model parameters. Performance metrics for model parameters are received from the one or more other devices and a global set of model parameters is selected for the device and the one or more other devices using the received performance metrics.

16 Claims, 41 Drawing Sheets

(51) Int. Cl.
  *H04L 12/801* (2013.01)
  *H04L 12/855* (2013.01)
  *H04L 12/891* (2013.01)
  *H04L 12/753* (2013.01)

(56) References Cited

U.S. PATENT DOCUMENTS

| | | | |
|---|---|---|---|
| 7,657,940 | B2 | 2/2010 | Portolani et al. |
| 7,675,926 | B2 | 3/2010 | Olsen et al. |
| 7,694,335 | B1 | 4/2010 | Turner et al. |
| 7,733,798 | B2 | 6/2010 | White et al. |
| 7,779,471 | B2 | 8/2010 | Balasubramaniyan et al. |
| 7,793,138 | B2 | 9/2010 | Rastogi et al. |
| 7,854,000 | B2 | 12/2010 | Venkat et al. |
| 7,971,256 | B2 | 6/2011 | Bhikkaji et al. |
| 8,032,779 | B2 | 10/2011 | Clemm et al. |
| 8,121,024 | B1 | 2/2012 | Natarajan et al. |
| 8,161,554 | B2 | 4/2012 | Sadhasivam et al. |
| 8,230,498 | B2 | 7/2012 | Shaffer et al. |
| 8,261,355 | B2 | 9/2012 | Rayes et al. |
| 8,312,541 | B2 | 11/2012 | Levy-Abegnoli et al. |
| 8,619,576 | B2 | 12/2013 | Vasseur et al. |
| 8,634,316 | B2 | 1/2014 | Rosenberg et al. |
| 2008/0083029 | A1 | 4/2008 | Yeh et al. |
| 2008/0148342 | A1 | 6/2008 | Aiyagari et al. |
| 2011/0258702 | A1 | 10/2011 | Olney et al. |
| 2012/0023572 | A1 | 1/2012 | Williams, Jr. et al. |
| 2012/0026938 | A1 | 2/2012 | Pandey et al. |
| 2012/0155475 | A1 | 6/2012 | Vasseur et al. |
| 2012/0230204 | A1 | 9/2012 | Vasseur et al. |
| 2012/0320923 | A1 | 12/2012 | Vasseur et al. |
| 2013/0010610 | A1 | 1/2013 | Karthikeyan et al. |
| 2013/0024560 | A1 | 1/2013 | Vasseur et al. |
| 2013/0159479 | A1 | 6/2013 | Vasseur |
| 2013/0159548 | A1 | 6/2013 | Vasseur et al. |
| 2013/0179538 | A1 | 7/2013 | Dutta et al. |
| 2013/0219046 | A1 | 8/2013 | Wetterwald et al. |
| 2013/0276114 | A1 | 10/2013 | Friedrichs et al. |
| 2013/0298184 | A1 | 11/2013 | Ermagan et al. |
| 2014/0022906 | A1 | 1/2014 | Vasseur et al. |
| 2014/0025945 | A1 | 1/2014 | McGrew et al. |

OTHER PUBLICATIONS

Jover, R.P., "Security Attacks Against the Availability of LTE Mobility Networks: Overview and Research Directions", 16th International Symposium on Wireless Personal Multimedia Communications (WPMC), Jun. 2013, 9 pages, Atlantic City, NJ.

Lippmann, et al., "Analysis and Results of the 1999 DARPA Off-Line Intrusion Detection Evaluation", Proceedings of the Third International Workshop on Recent Advances in Intrusion Detection, RAID, (2000), pp. 162-182, Springer-Verlag, London, UK.

Oh, et al., "Distributed Learning in Mobile Sensor Networks Using Cross Validation" 49th IEEEE Conference on Decision and Control, Dec. 2010, 6 pages, Institute of Electrical and Electronics Engineers, Atlanta, GA.

Ryan, et al., "Intrusion Detection with Neural Networks", Technical Report WS-97-07, (1997), pp. 72-77, Association for the Advancement of Artificial Intelligence.

Sommer, R., "Outside the Closed World: On Using Machine Learning for Network Intrusion Detection", IEEE Symposium on Security and Privacy, May 2010, pp. 305-316, Intitute of Electrical and Electronics Engineers, Oakland, CA.

Vasseur et al., "Computer Network Anomaly Training and Detection Using Artificial Neural Networks", U.S. Appl. No. 61/923,847, filed Jan. 6, 2014, 166 pgs., U.S. Patent and Trademark Office, Alexandria, Virginia.

Vasseur, et al., "Routing Metrics Used for Path Calculation in Low-Power and Lossy Networks", Request for Comments 6551, Mar. 2012, 30 pages, Internet Engineering Task Force Trust.

Viola, et al. "Rapid Object Detection Using a Boosted Cascade of Simple Features", Proceedings of the 2001 IEEE Computer Vision and Pattern Recognition, vol. 1, (2001), 8 pages, Institute of Electical and Electronics Engineers.

Winter, et al., "RPL: IPv6 Routing Protocol for Low-Power and Lossy Networks", Request for Comments 6550, Mar. 2012, 157 pages, Internet Engineering Task Force Trust.

Zinkevic, et al., "Parallelized Stochastic Gradient Descent", Proceedings of the Advances in Neural Information Processing Systems 23 (2010), 37 pages.

\* cited by examiner

FAR-2

FAR-1

FAR-3

FAR-2

FAR-3

LEARNING MODEL SELECTION IN A DISTRIBUTED NETWORK

RELATED APPLICATIONS

This application claims priority to U.S. Provisional Application No. 61/923,847, filed Jan. 6, 2014, entitled: COMPUTER NETWORK ANOMALY TRAINING AND DETECTION USING ARTIFICIAL NEURAL NETWORKS, by Vasseur, et al., the contents of which are herein incorporated by reference.

TECHNICAL FIELD

The present disclosure relates generally to computer networks, and, more particularly, to the use of learning machines within computer networks.

BACKGROUND

Low power and Lossy Networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. The challenging nature of these networks is exacerbated by the large number of nodes (an order of magnitude larger than a "classic" IP network), thus making the routing, Quality of Service (QoS), security, network management, and traffic engineering extremely challenging, to mention a few.

Machine learning (ML) is concerned with the design and the development of algorithms that take as input empirical data (such as network statistics and performance indicators), and recognize complex patterns in these data. In general, these patterns are then used to make decisions automatically (i.e., close-loop control) or to help make decisions. ML is a very broad discipline used to tackle very different problems (e.g., computer vision, robotics, data mining, search engines, etc.), but the most common tasks are the following: linear and non-linear regression, classification, clustering, dimensionality reduction, anomaly detection, optimization, and association rule learning.

One very common pattern among ML algorithms is the use of an underlying model M, whose parameters are optimized for minimizing the cost function associated to M, given the input data. For instance, in the context of classification, the model M may be a straight line that separates the data into two classes such that M=a*x+b*y+c and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Learning Machines (LMs) are computational entities that rely on one or more ML techniques for performing a task for which they have not been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator.

Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
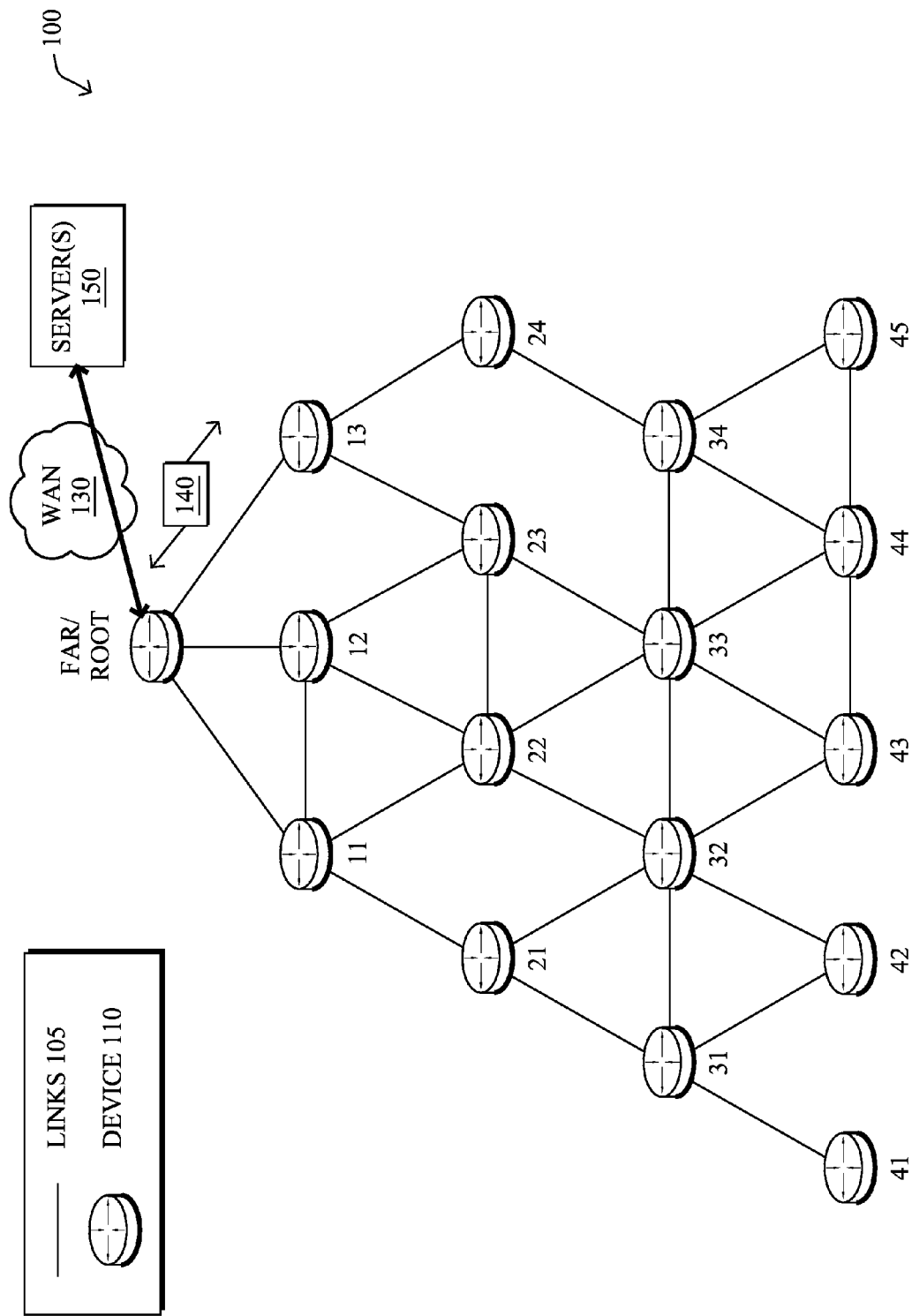
FIG. 1 illustrates an example communication network.

According to one or more embodiments of the disclosure, local model parameters are generated by training a machine learning model at a device in a computer network using a local data set. One or more other devices in the network are identified that have trained machine learning models using remote data sets that are similar to the local data set. The local model parameters are provided to the one or more other devices to cause the one or more other devices to generate performance metrics using the provided model parameters. Performance metrics for model parameters are received from the one or more other devices and a global set of model parameters is selected for the device and the one or more other devices using the received performance metrics.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad- Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications), temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 110 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. The illustrative root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
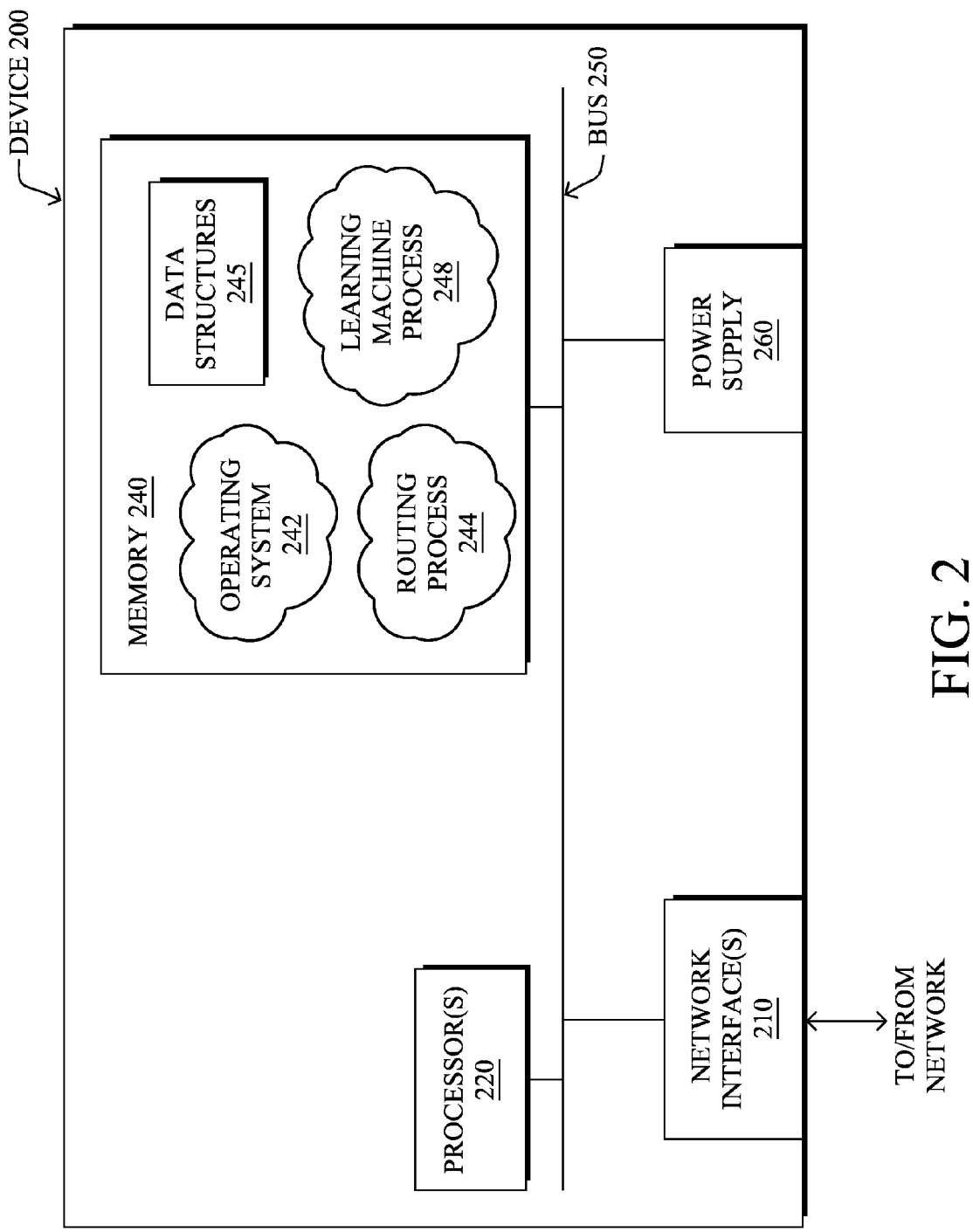
FIG. 2 illustrates an example network device/node.

FIG. 2 is a schematic block diagram of an example node/device 200 that may be used with one or more embodiments described herein, e.g., as any of the nodes or devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. Operating systems 242, portions of which are typically resident in memory 240 and executed by the processor, functionally organizes the device by, inter alia, invoking operations in support of software processes and/or services executing on the device. These software processes and/or services may comprise routing process/services 244 and an illustrative "learning machine" process 248, which may be configured depending upon the particular node/device within the network 100 with functionality ranging from intelligent learning machine algorithms to merely communicating with intelligent learning machines, as described herein. Note also that while the learning machine process 248 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols, as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnects are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" (or "Internet of Everything" or "IoE") may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs), FARs, or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward, and terminating at, one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by a DAG process and/or routing process 244) based on an Objective Function (OF). The role of the Objective Function is generally to specify rules on how to build the DAG (e.g. number of parents, backup parents, etc.).

Figure 3:
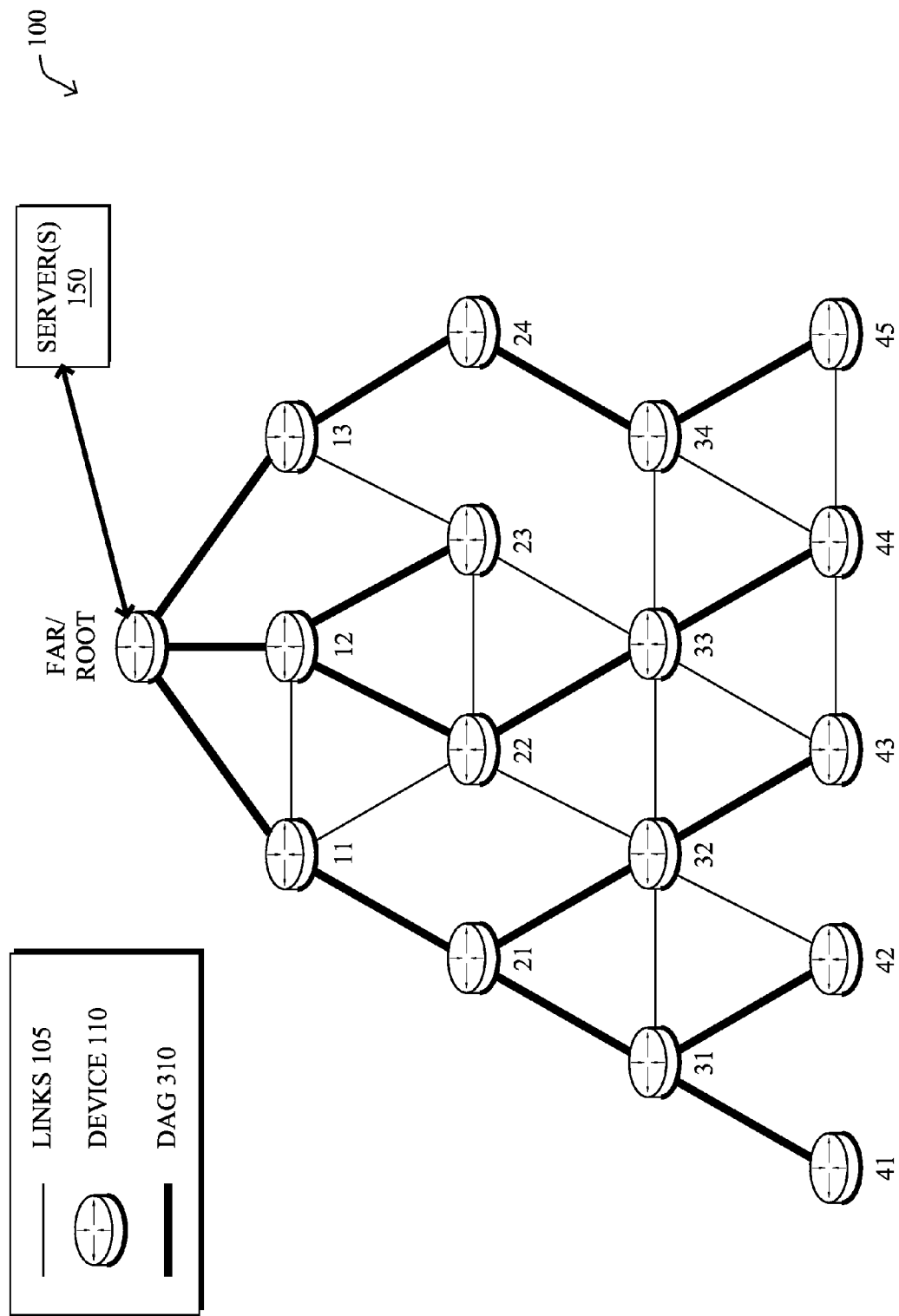
FIG. 3 illustrates an example directed acyclic graph (DAG) in the communication network of FIG. 1.
Figure 4A:
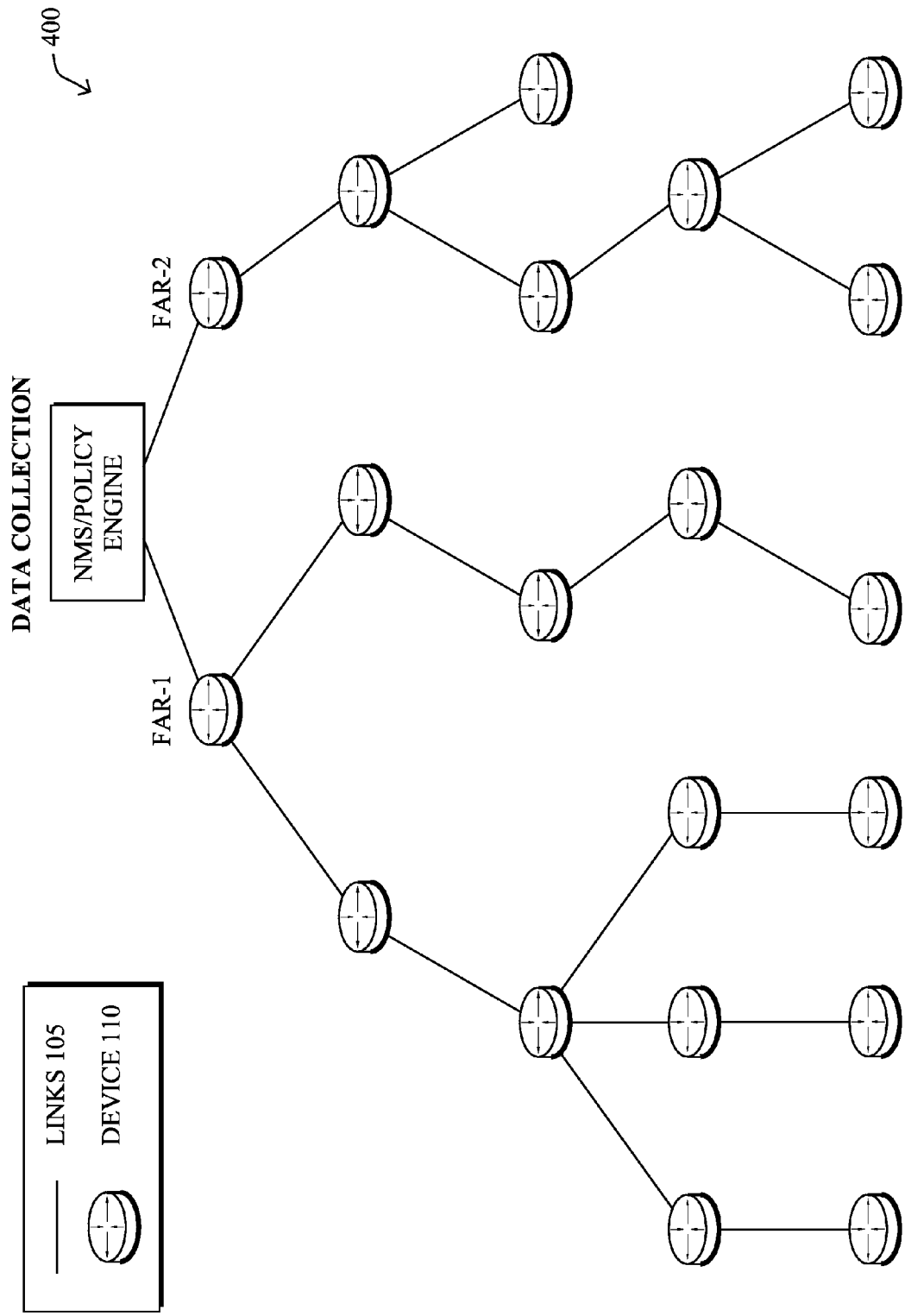
FIGS. 4A-4G illustrate example techniques for collecting feature data in a computer network.
Figure 4B:
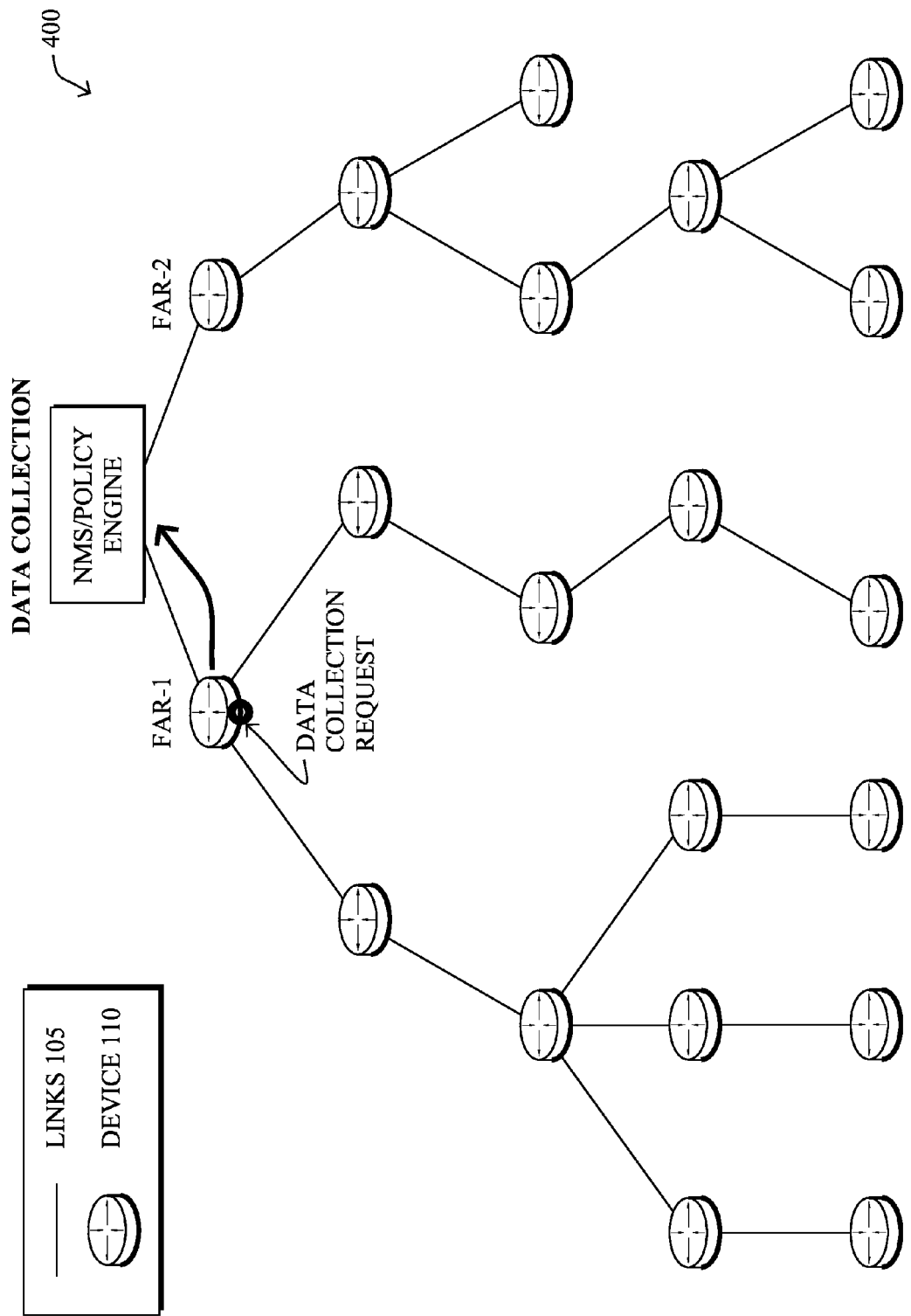
Figure 4C:
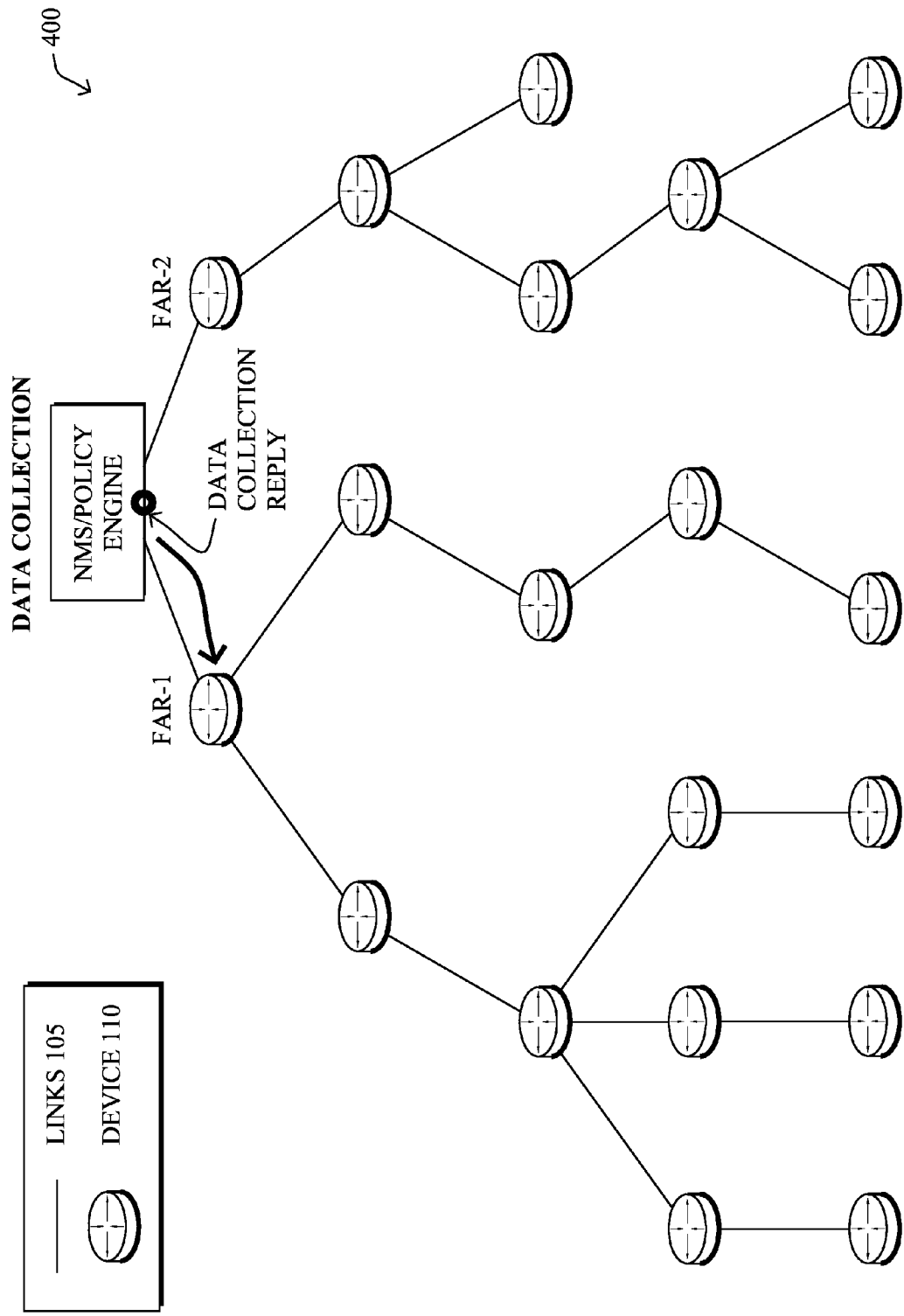
Figure 4D:
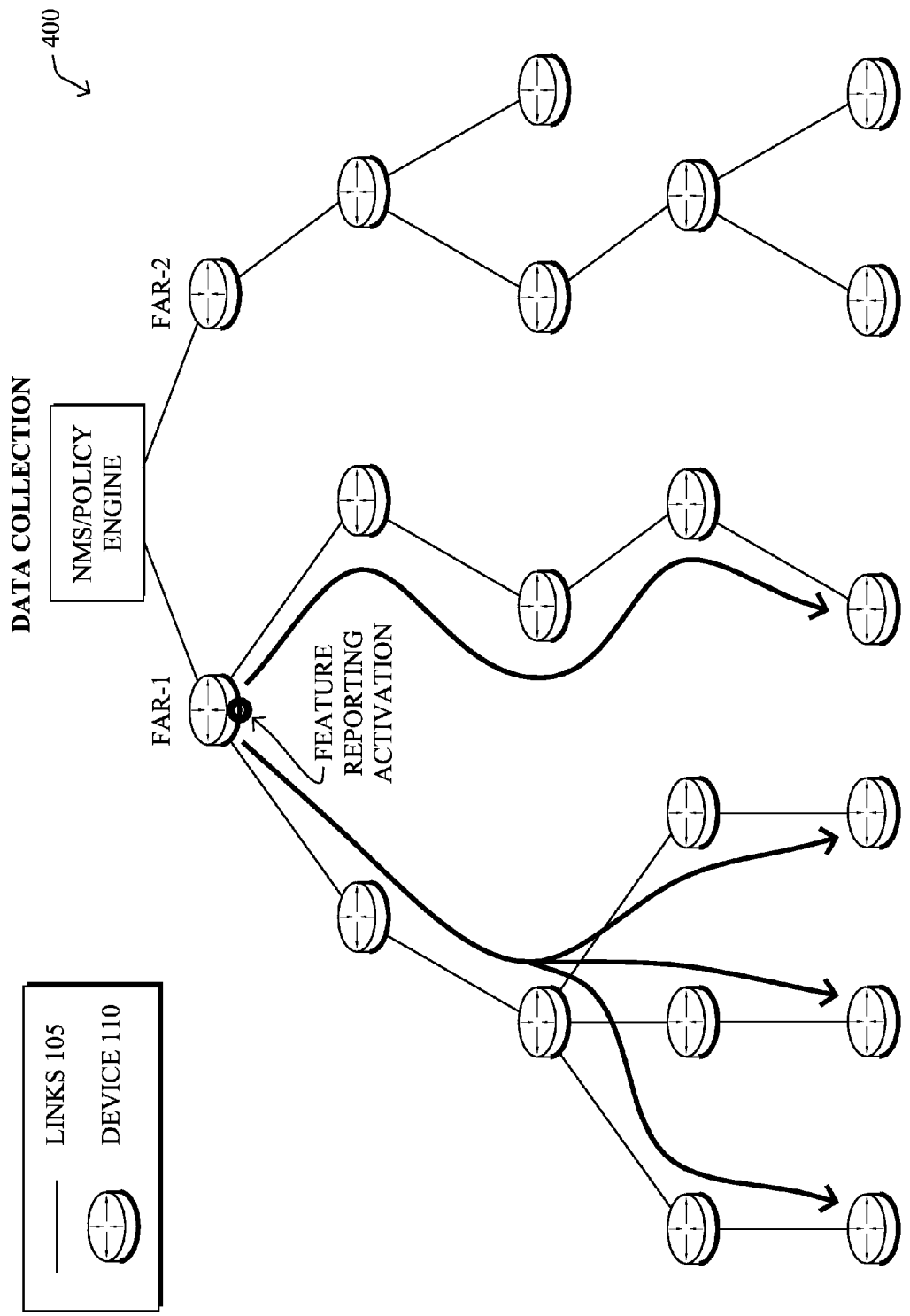
Figure 4E:
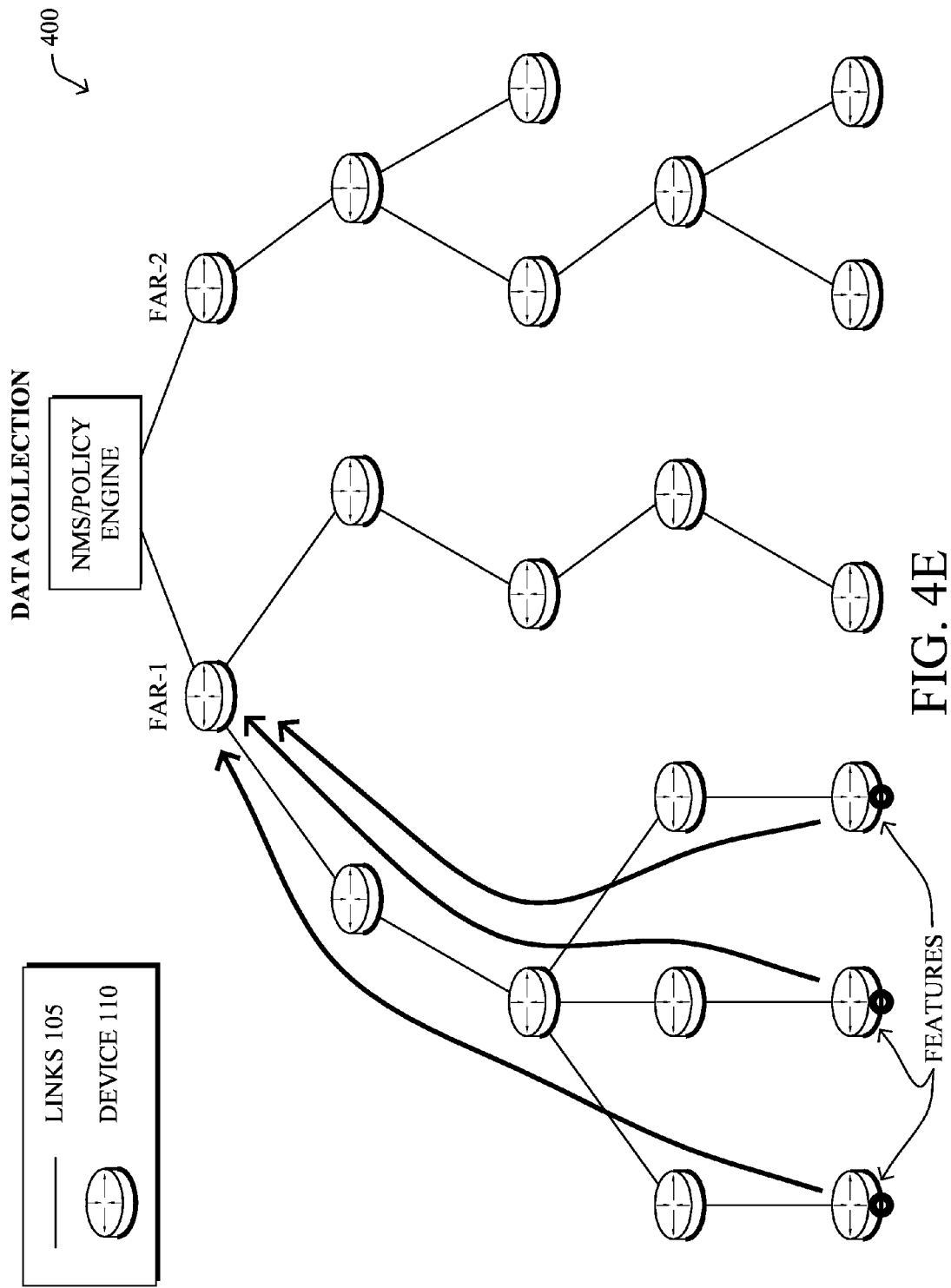
Figure 4F:
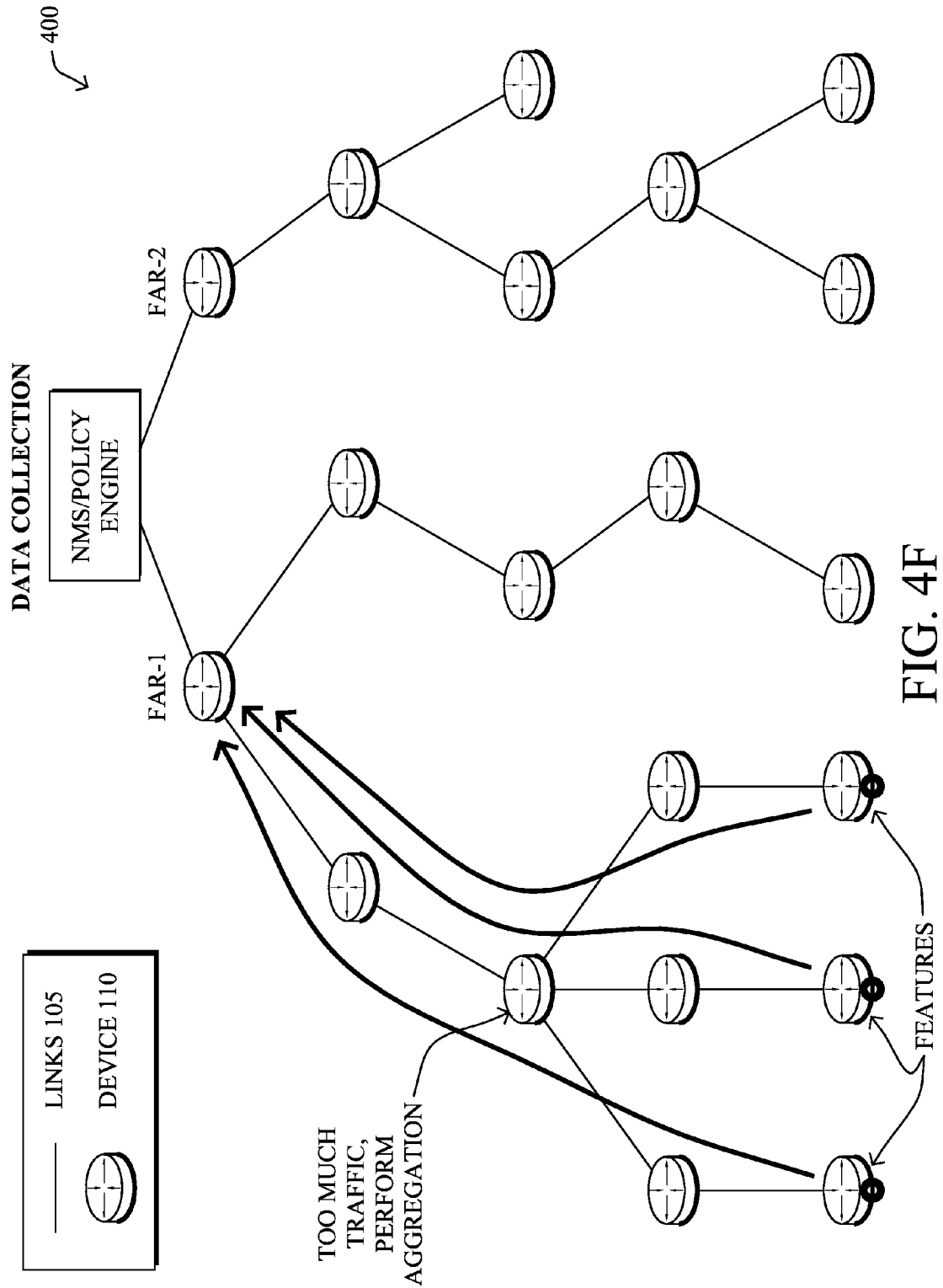
Figure 4G:
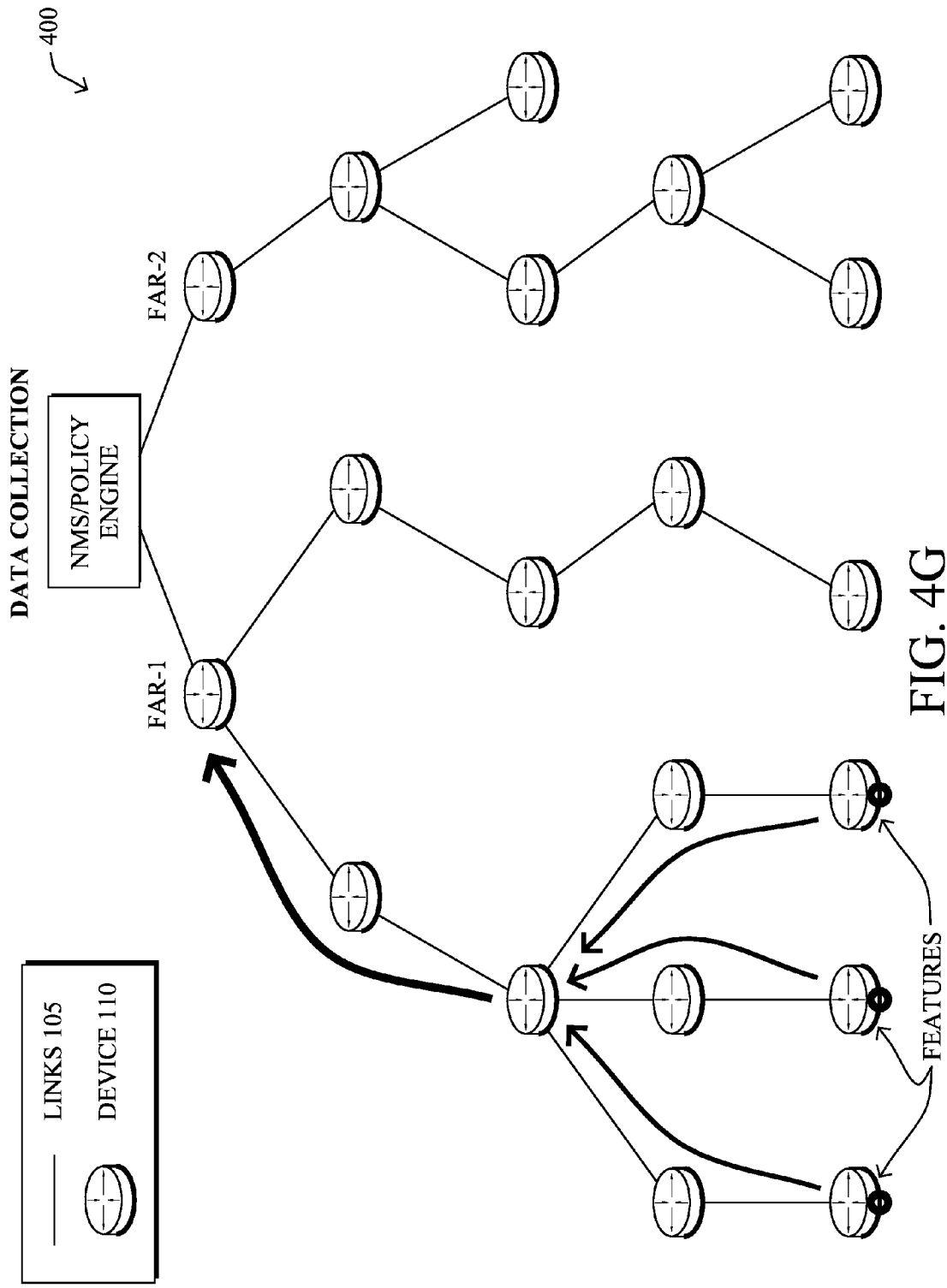
Figure 5A:
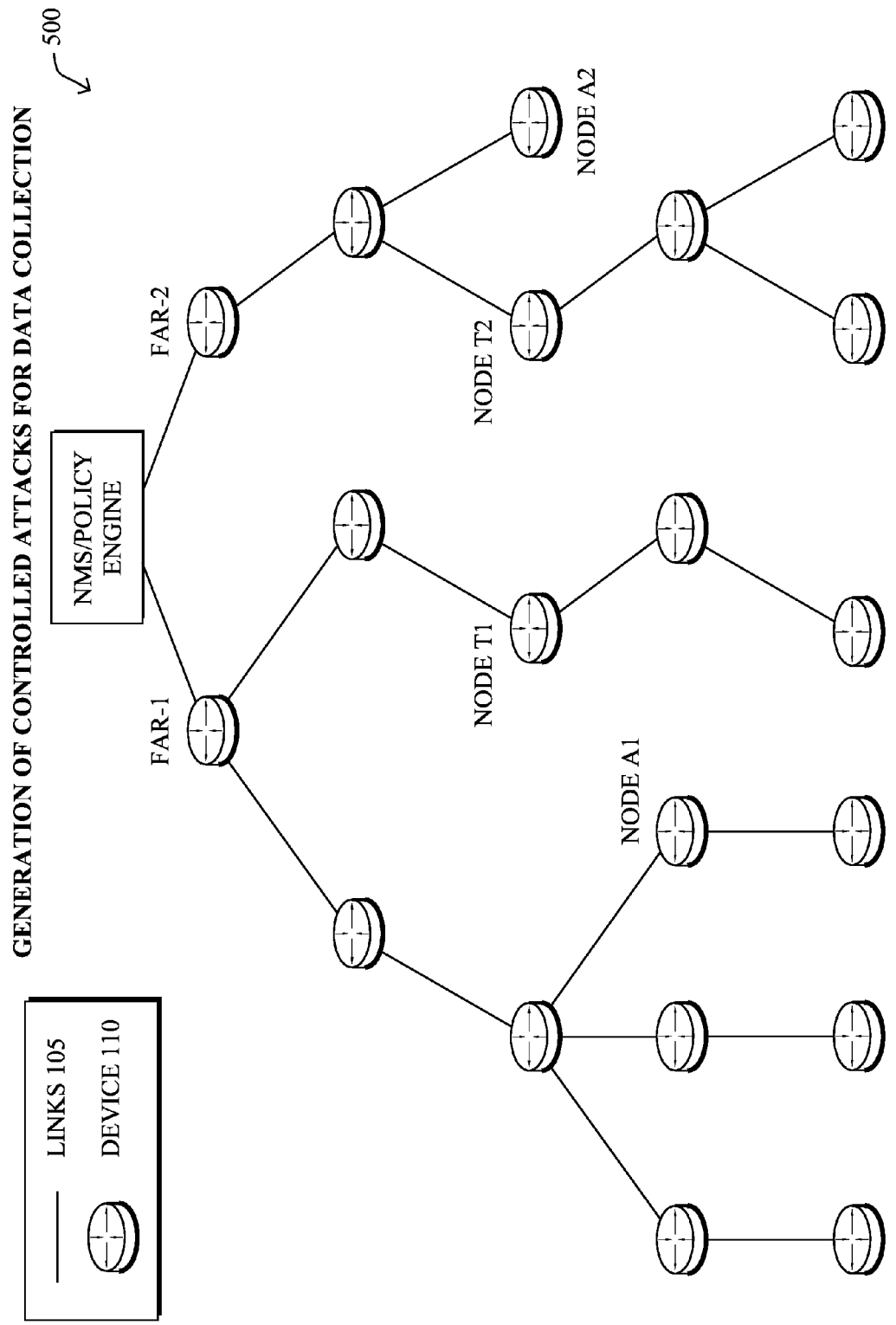
FIGS. 5A-5F illustrate example techniques for generating feature data by simulating network attacks.
Figure 5B:
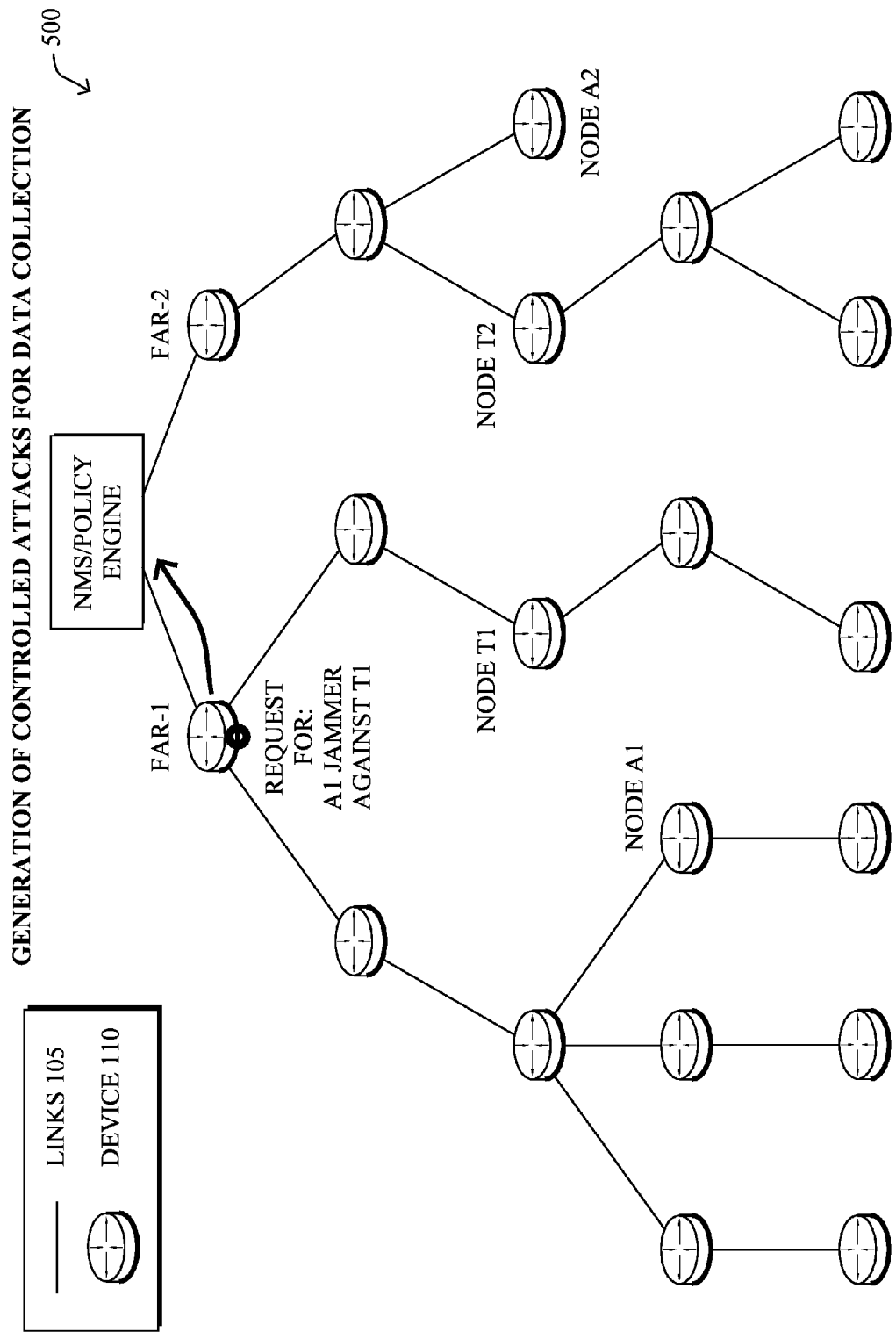
Figure 5C:
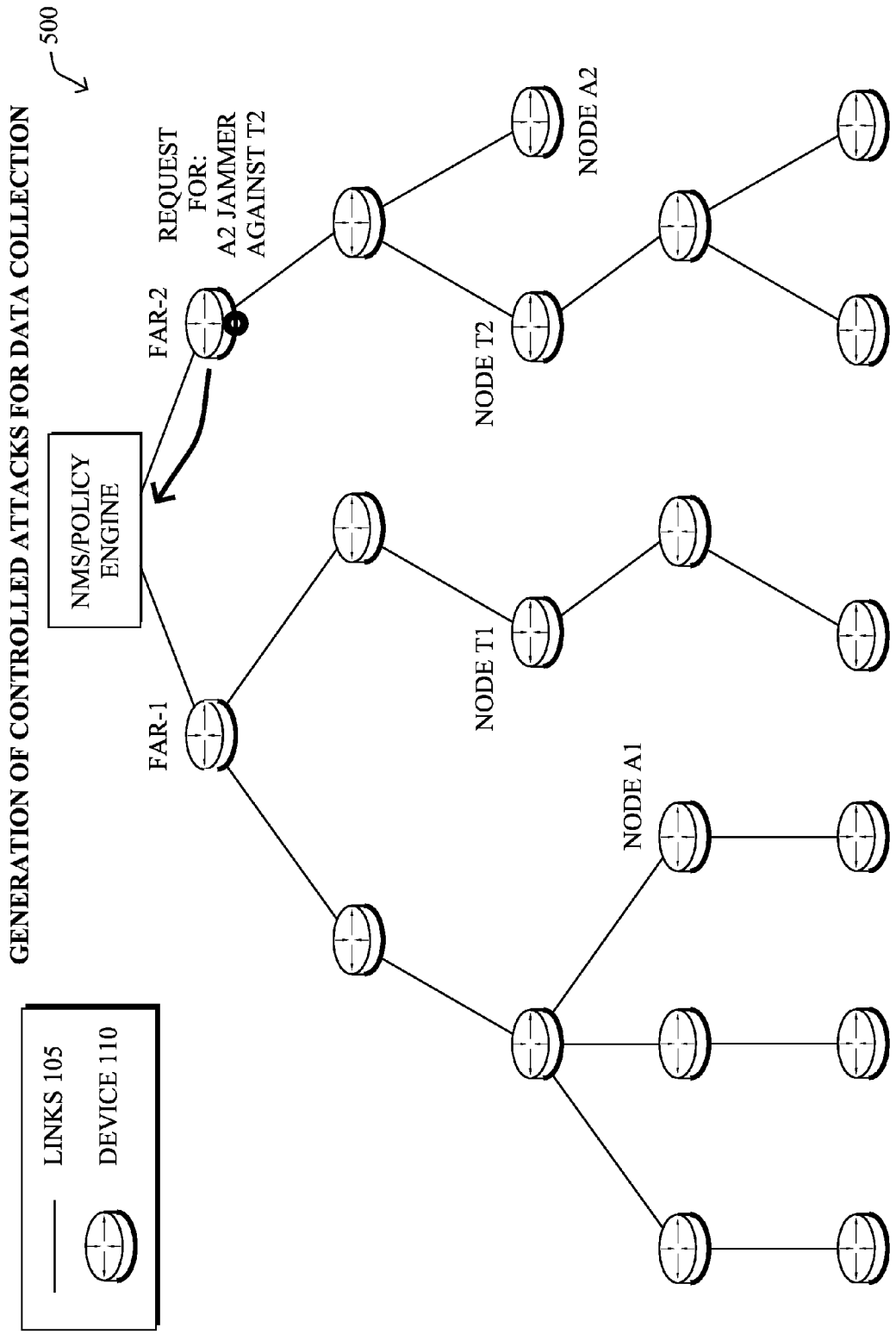
Figure 5D:
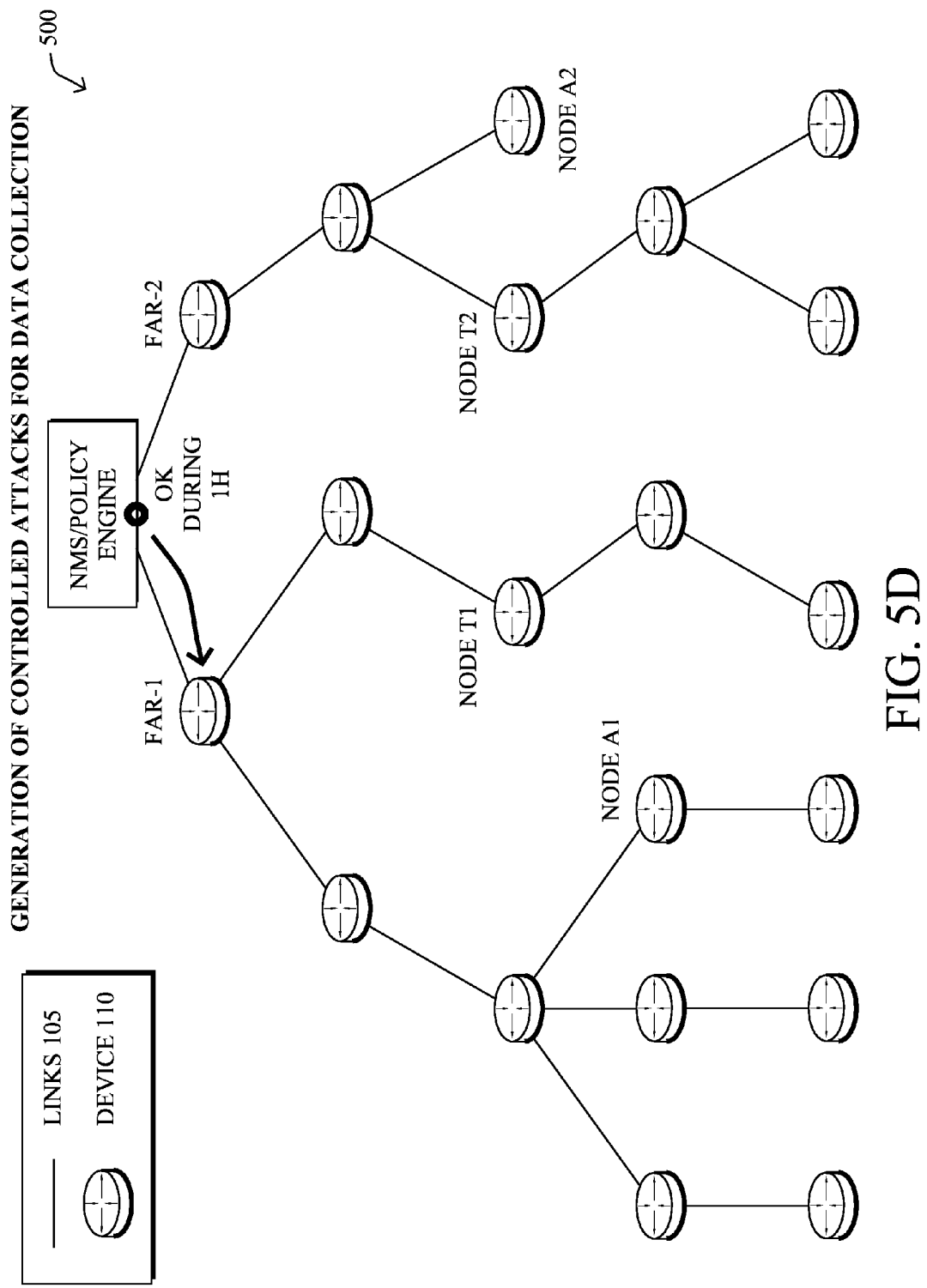
Figure 5E:
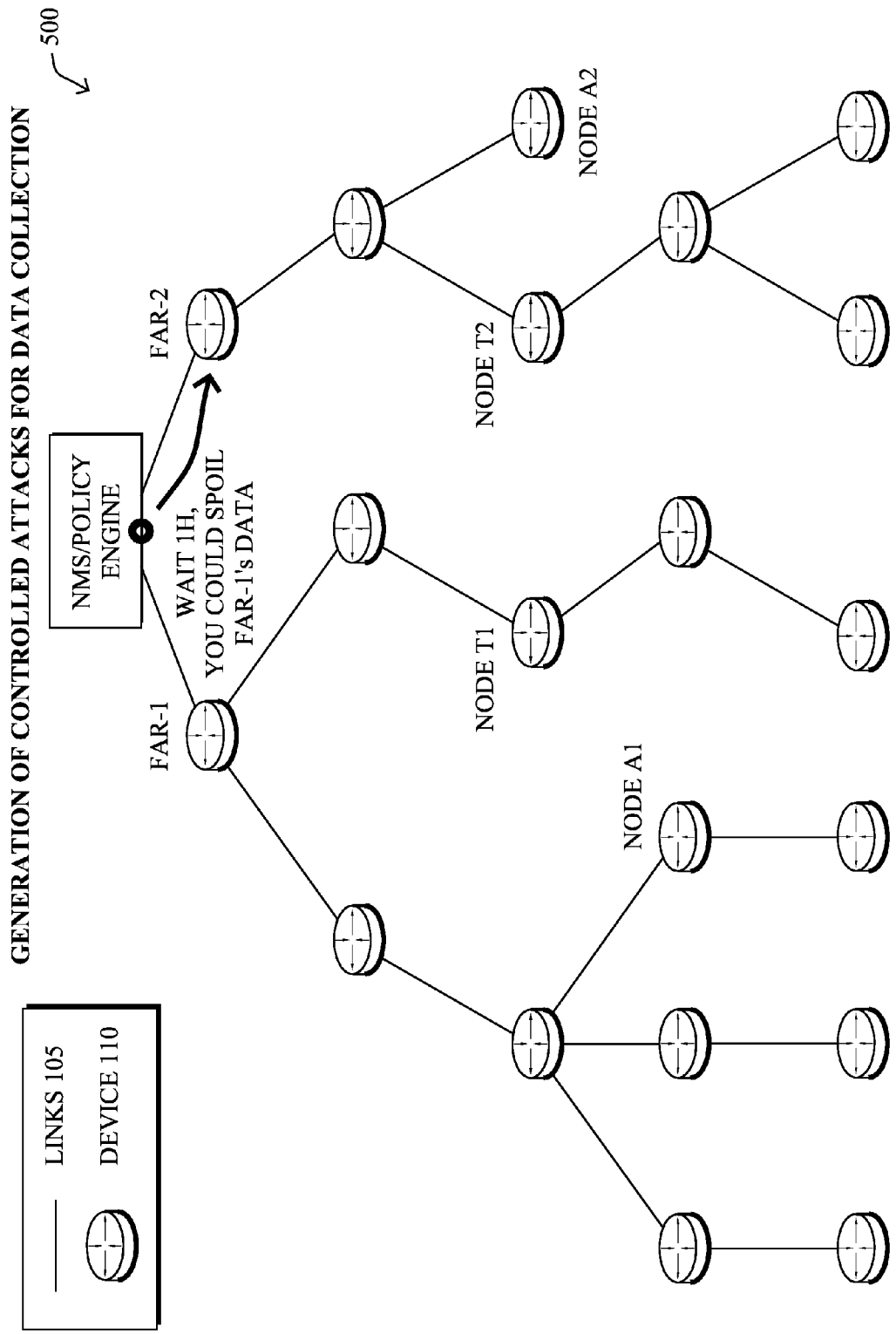
Figure 5F:
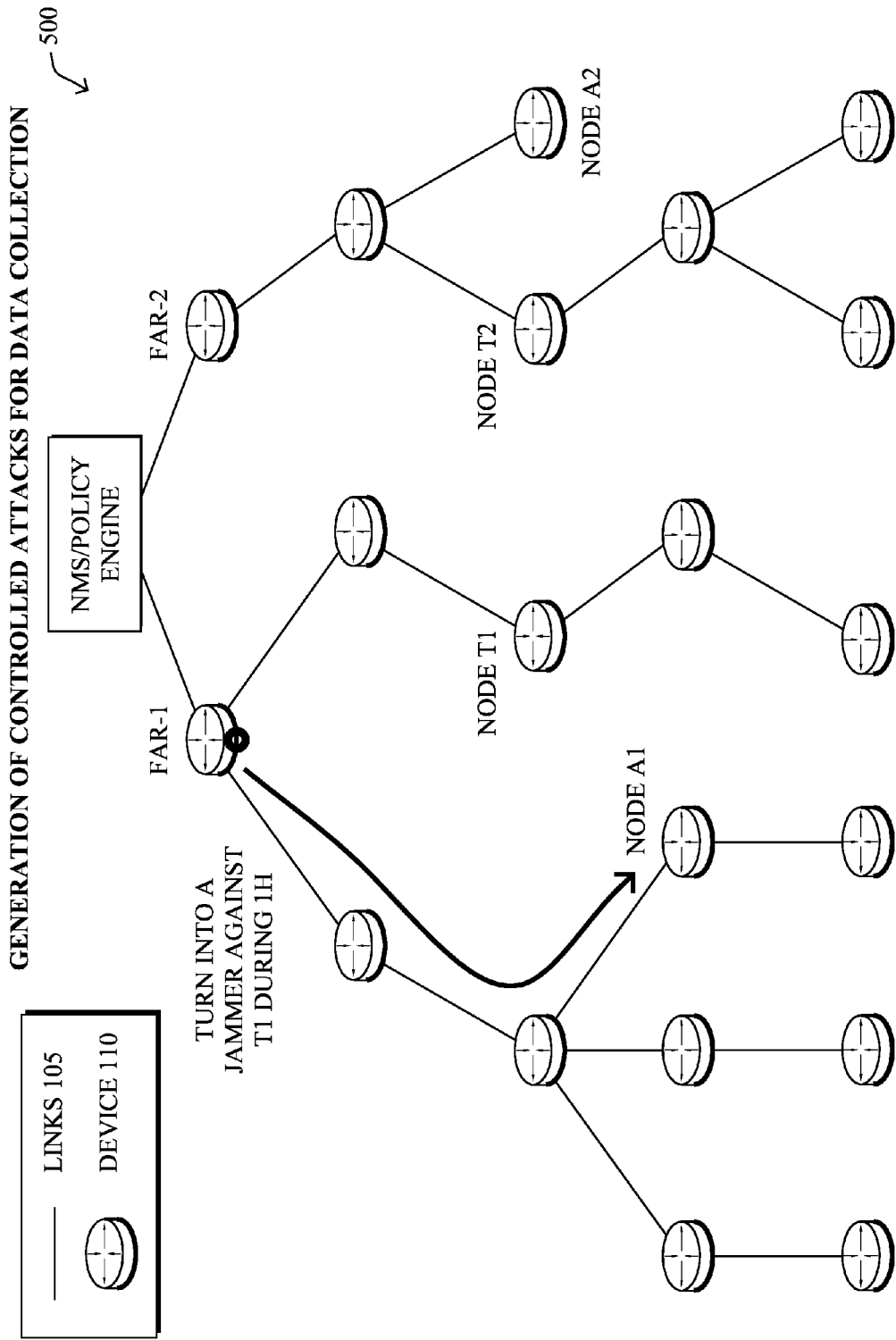

FIG. 3 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 310 (shown as bolded lines), which extends from the root node toward one or more leaf nodes (nodes without children). Traffic/packets 140 (shown in FIG. 1) may then traverse the DAG 310 in either the upward direction toward the root or downward toward the leaf nodes, particularly as described herein.

RPL supports two modes of operation for maintaining and using Downward routes:

1) Storing Mode: RPL routers unicast DAO messages directly to their DAG Parents. In turn, RPL routers maintain reachable IPv6 addresses for each of their DAG Children in their routing table. Because intermediate RPL routers store Downward routing state, this mode is called Storing mode.

2) Non-Storing Mode: RPL routers unicast DAO messages directly to the DAG Root. The DAO message also includes the IPv6 addresses for the source's DAG Parents. By receiving DAO messages from each RPL router in the network, the DAG Root obtains information about the DAG topology and can use source routing to deliver datagrams. Unlike Storing mode, intermediate RPL routers in Non-Storing mode do not maintain any Downward routes.

Learning Machine Technique(s)

As noted above, machine learning (ML) is concerned with the design and the development of algorithms that take as input empirical data (such as network statistics and performance indicators), and recognize complex patterns in these data. One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

As also noted above, learning machines (LMs) are computational entities that rely on one or more ML algorithms for performing a task for which they have not been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficient management by a network operator. Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

Artificial Neural Networks (ANNs) are a type of machine learning technique whose underlying mathematical models were inspired by the hypothesis that mental activity consists primarily of electrochemical activity between interconnected neurons. ANNs are sets of computational units (neurons) connected by directed weighted links. By combining the operations performed by neurons and the weights applied by their links, ANNs are able to perform highly non-linear operations on their input data.

The interesting aspect of ANNs, though, is not that they can produce highly non-linear outputs of the input. The truly interesting aspect is that ANNs can "learn" to reproduce a predefined behavior through a training process. This capacity of learning has allow the successful application of ANNs to a wide variety of learning problems, such as medical diagnostics, character recognition, data compression, object tracking, autonomous driving of vehicles, biometrics, etc.

Learning in ANNs is treated as an optimization problem where the weights of the links are optimized for minimizing a predefined cost function. This optimization problem is computationally very expensive, due to the high number of parameters to be optimized, but thanks to the backpropagation algorithm, the optimization problem can be performed very efficiently. Indeed, the backpropagation algorithm computes the gradient of the cost function with respect to the weights of the links in only one forward and backward pass throw the ANN. With this gradient, the weights of the ANN that minimize the cost function can be computed.

Denial of service (DoS) is a broad term for any kind of attack aiming at, by any means, making a particular service unavailable (be it a certain application running on a server or network connectivity itself). This is usually performed by bringing the target's resources to exhaustion (again, target resources may range from bandwidth to memory and CPU).

In greater detail, a DoS attack may consist in flooding a target network with hundreds of megabits of traffic (volume based DoS), exhausting a server state by opening a large number of TCP connections (SYN flooding), or by making an HTTP server unavailable by sending it an overwhelming number of requests. An attack may be more subtle and exploit well-known vulnerabilities in the target system (e.g. a large number of fragmented IP packets may exhaust the resources of a router).

Nowadays, DoS attacks are mostly distributed, i.e., they are carried out by multiple sources at the same time, thus making it more difficult to track. In many cases, botnets (i.e. armies or infected hosts spread across the network and under the control of a single master) are used for mounting DoS attacks. In addition, source addresses used for attacks can be spoofed, so that blocking an offending address is potentially useless.

In general, DoS attacks are easy to detect when they are brute-force, but, especially when highly distributed, they may be difficult to distinguish from a flash-crowd (i.e. an overload of the system due to many legitimate users accessing it at the same time).

Statistics and machine learning techniques have been proposed for detecting attacks at the server or network level. Some approaches try to analyze changes in the overall statistical behavior of the network traffic (e.g. the traffic distribution among flow flattens when a DDoS attack based on a number of microflows happens). Other approaches aim at statistically characterizing the normal behaviors of network flows or TCP connections, in order to detect significant deviations.

However, the Internet of Things (IoT) represents a completely different scenario and requires novel detection and reaction strategies. Its highly distributed nature implies that there is no central vantage point from which an attack can be observed. In addition, the scarce resources of the IoT force reporting from the nodes to a central location to be reduced to a minimum.

On top of the lack of global information, detecting DoS in the IoT is made harder by the fact that a much more subtle interference of the network's operations may be enough to bring the network down. For example, a jamming node can prevent a node from decoding traffic by just emitting short bursts when activity on the channel is detected. This can isolate a large portion of the network which uses that node as a parent and cut off a large portion of the network. In addition, in the case of battery operated nodes, a slow but steady flow of malicious traffic can exhaust a node's battery, thus making the node useless in a matter of days.

Due to the high variability of this kind of network, the symptoms of those attacks are not easy to detect and can be lost in the normal noise of the network behavior (traffic peaks and topology changes are quite normal in LLN). Therefore, an intelligent approach is needed that is able to reveal subtle changes in the measured data that are typical of a known anomalous behavior.

Possible Attacks Against IoT

Even though the existing literature regarding possible attack types against the IoT is limited, a number of attacks against sensor network technologies may apply with a few minor modifications. Such attacks can be roughly classified into two classes: 1.) insider attacks (i.e., where the malicious node needs to be authenticated and be in possession of the network encryption keys), and 2.) outsider attacks (i.e., where the attacker just needs to be within the radio range of the victims).

In particular, a number of attacks against routing performed by a malicious node in the DAG can be imagined. A node can, for example, perform selective forwarding. In other words, the node could just discard some of the traffic messages that it is asked to forward, while still participating correctly within the routing protocol. Although this can potentially be revealed by end-to-end mechanisms, detection of this type of attack can be difficult and slow due to the low traffic rate and lossiness of IoT networks. Other example attacks include a malicious node impersonating multiple identities or advertising forged routing information, so as to gain a central role in the routing topology.

While attacks belonging to the former class can be prevented through well-designed cryptography and authentication, in the latter case they have to be detected by monitoring the network environment.

The simplest form of attack that can be performed against an RF network is jamming. This consists in artificially creating an interference, so as to prevent message decoding. There are several variations of a jamming attack, with different degrees of complexity and subtlety. The attacker can continuously emit power on the spectrum (continuous jamming), create a collision when it detects activity on the channel (reactive jamming), or attack only a particular type of traffic (selective jamming). The damage from a jamming attack can be maximized if the attacker is able to estimate the centrality of a node in the routing topology. This can be obtained by accounting for the amount of traffic transmitted and received by each node, by leveraging the fact that the link layer addresses are in clear. Once the jammer has detected the most central node, it can try to make this node unreachable for its descendants, which will in turn be forced to select another parent. This can potentially create continuous route oscillations and convergences.

Other kinds of external DoS attacks can be performed by exploiting the fact that a number of messages in the WPAN do not need authentication, such as discovery beacons and some of the EAPoL messages used for authentication. In particular, discovery beacons can be used for injecting false synchronization information into the network, so as to prevent two nodes from meeting on the right unicast communication frequency. EAPoL authentication messages, instead, have to be relayed by the WPAN nodes up to the FAR, and from there until the AAA server. This mechanism allows an attacker to generate routable traffic, thus flooding the network and wasting bandwidth and processing power. A mitigation strategy may to have authentication requests be rate-limited. However this may result in legitimate nodes being prevented from authenticating when an attack is in progress.

Other attacks can be performed against networks that use the 802.11i protocol, which is used for exchanging key information between the authenticating node and the FAR (and therefore, cannot be protected by link layer encryption). Such attacks are documented in the scientific literature and aim at blocking the handshake between the client and the access point. This can be achieved by an attacker by interleaving a forged message between two messages in the handshake. This implicitly resets the handshake state, so that subsequent messages from the authenticating node are discarded.

Frequency-hopping and Synchronization in 802.15.4

In a channel-hopping mesh network, devices communicate using different channels at different times. To communicate a packet, a transmitter-receiver pair must be configured to the same channel during packet transmission. For a transmitter to communicate with a receiver at an arbitrary time in the future, the transmitter and receiver must synchronize to a channel schedule that specifies what channel to communicate on and at what time. Channel schedules may be assigned to each transmitter-receiver pair independently so that neighboring transmitter-receiver pairs can communicate simultaneously on different channels. Such a strategy increases aggregate network capacity for unicast communication but is inefficient for broadcast communication. Alternatively, all devices in a network may synchronize with a single channel schedule such that all devices transmit and receive on the same channel at any time. Such a strategy increases efficiency for broadcast communication since a single transmission can reach an arbitrary number of neighbors, but decreases aggregate network capacity for unicast communication since neighboring individual transmitter-receiver pairs cannot communicate simultaneously without interfering. Mesh networks typically utilize both unicast and broadcast communication. Applications use unicast communication to communicate data to a central server (e.g. AMI meter reads) or configure individual devices from a central server (e.g. AMI meter read schedules). Network control protocols use unicast communication to estimate the quality of a link (e.g. RSSI and ETX), request configuration information (e.g. DHCPv6), and propagate routing information (e.g. RPL DAO messages). Applications use multicast communication for configuring entire groups efficiently (e.g. AMI meter configurations based on meter type), downloading firmware upgrades (e.g. to upgrade AMI meter software to a newer version), and for power outage notification. Network control protocols use multicast communication to discover neighbors (e.g. RPL DIO messages, DHCPv6 advertisements, and IPv6 Neighbor Solicitations) and disseminate routing information (e.g. RPL DIO messages). Existing systems optimize for both unicast and broadcast communication by synchronizing the entire network to the same channel-switching schedule and using a central coordinator to compute and configure channel schedules for each individual device, or else more efficiently optimizing for both unicast and broadcast communication in a channel-hopping network without need for centrally computing schedules for individual nodes.

In order to join the WPAN enabled with frequency hopping (e.g., an 802.15.4 WPAN), a node needs to synchronize on the frequency hopping schedule of its neighbors. Therefore, each node in the WPAN broadcasts its unicast reception schedule via a discovery beacon, which is not encrypted and sent on every frequency: this allows nodes joining the PAN to join. In greater detail, the discovery beacon message is sent a broadcast destination WPAN and includes several information elements, most notably:

The WPAN SSID String

The unicast scheduling information. In one implementation, this is made up of a slot number and an offset value. This allows the receiving node to compute the slot number the sending node is currently is, and thus, by applying a hash function, to know its current receiving frequency. Note that this algorithm does not require the clocks of the two nodes to be synchronized.

The transmission of a discovery beacon is triggered by an associated trickle timer. However, the information about the scheduling of the broadcast slot is not included in such a beacon, but only in the synchronous and unicast beacons, which are encrypted with the network key. In particular, the synchronous beacon is triggered by a trickle timer and it is sent on every frequency (just as the discovery beacon). The unicast beacon, on the contrary, is sent upon request by another node by using a standard unicast transmission. In both cases, the beacon includes a broadcast scheduling information element, which has the same format of the unicast scheduling IE (Information Element). As a consequence, an attacker can interfere with its target during its unicast slot, but ignores the broadcast frequency schedule: the broadcast schedule is therefore much better protected against DoS attacks.

802.15.4 Security

Currently, IoT architecture comes with several embedded security mechanisms. The cornerstone of IoT security is indeed link layer encryption, which is mandatory for most frames (including routing messages and application traffic). Besides pure encryption, link layer security ensures message integrity (through an encrypted MAC code) and message non-replication (through an encrypted sequence number included in the encrypted message payload).

In order to install the necessary link layer keys on every node, an authentication procedure is carried out when the node joins the network. Such a procedure is based on the EAPOL protocol, which is carried directly over layer 2 messages and is used for transporting authentication data from the node to the FAR (notice that such messages are not encrypted). On top of EAPOL, two main protocols are carried: EAP messages, which the FAR tunnels to an AAA server through the RADIUS and 802.11i messages, which are used for exchanging cryptographic material between the FAR and the node.

In greater detail, EAP messages are used by the node for mutual authentication with the AAA server and securely agree on a shared secret; to this end, a complete TLS handshake is, in turn, tunneled over EAP messages and a public key mechanism based on X509 certificates is used for identity validation. Once such shared secret has been established, the AAA server transmits it to the FAR, which, in turn, uses it for exchanging the link layer keys with the node through the 802.11i protocol.

Notice that the shared secret negotiated through EAP is stored by the node in persistent memory and can be reused for subsequent authentication (in this case, EAP is skipped and the link layer key is directly exchanged through 802.11i).

Learning Model Selection in a Distributed Network

Simplified examples of techniques for using a machine learning model in a computer network are shown in FIGS. 4A-7E, according to various embodiments. In FIGS. 4A-4G, a network node/device (e.g., FAR-1 executing a first machine learning model) may initiate the collection of feature data used as inputs to the model. For constrained networks, such as LLNs, one or more intermediary nodes may aggregate the collected data to reduce network node, as shown in FIGS. 4D-4G. In some embodiments, one or more network attacks may be simulated to generate the collected data (e.g., if the model is to detect a network attack), as shown in the examples of FIGS. 5A-5F. In FIGS. 6A-6P, various techniques are shown to train the learning machine. Finally, as shown in FIGS. 7A-7E, a trained machine learning model may be used within the network, for example, to detect a network attack.

Training a learning machine in a network such as an LLN environment may depend on the availability of a large data set that is capable of characterizing the extremely large variability of the possible phenomena. In one technique, training is carried out on by the learning machine model hosted in a distributed fashion on an edge router, such as a FAR that manages a large number of nodes. As will be appreciated, the techniques described herein with regard to a FAR may also be applied to other network devices, such as other nodes and routers or switches. However, even from the vantage point of a FAR, it may not be possible to observe the whole possible variability of a data set. For example, some weather conditions affecting signal propagation may not be observed in a given WPAN during the training period, while they may occur during the network operation period. Another example may be an application feature, which may be installed only on certain WPANs at the moment of training, while being activated or installed later.

According to various embodiments, the diversity of the dataset observed by multiple FARs in the same administrative domain may be leveraged to train a learning machine model. In general, the ensemble of the dataset gathered by the different FARs is more likely to represent the whole variability of the observable data than by a single FAR. Unfortunately, the amount of information collectively collected can be considerably large especially in context of constrained networks and the bandwidth available to those FARs may be low (e.g., the FARs may be connected through a mobile or satellite network). Therefore, collecting the whole dataset in one place for LM training is not a viable in most cases. In various embodiments, the techniques herein provide a distributed mechanism to capture the diversity of the dataset while keeping the amount of data to be exchanged low that leverages a voting system among a set of LMs in order to select the most general model among those computed locally as a global model. In other words, the most general model refers to the model that has been computed to take into account the largest variability in the dataset.

Said differently, the techniques herein cooperatively choose the most general learning machine model (e.g., a classifier computed by an ANN or other model) among those trained from each FAR in a particular set. This allows compensating for the local dataset missing significant characterization of some scenarios, which may be observed in other similar PANs or other networks. In various embodiments, each FAR trains its own learning machine model, and exports the parameters characterizing the performance of learning models using its local dataset of the model to other FARs for cross-validation. Subsequently, the score for each of the trained models is multicast to each FAR in the set. Once every FAR received a performance score for each of those cross-validations, a FAR selects a model with the largest generality, provided that the model still yields acceptable performance on the local data set.

The techniques provide a sharp contrast with existing cross-validation techniques. In some cases, cross-validation is used to estimate the capacity of generalization of a learning machine, i.e., the real performance of the learning machine. Typically, cross-validation is performed as follows. Given a dataset for training a learning machine, the whole set is divided in two separated subsets: 1.) the training set and 2.) the validation set. Then, the learning machine model is trained using only the samples in the training set and once the training is done, the performance of the obtained LM is evaluated in the validation set. For improving the estimation of the LM performance, multiple cross-validations are sometimes performed, using different partitions of the original dataset. The generalization capacity can be used for detecting and avoiding overfitting. The estimation of the generalization capacity can also be used for choosing the best learning machine among a set of learning machines. For instance, cross-validation may be used to choose the model with the best fitting score amongst a set of models that are computed on different datasets collected by different moving sensors.

In contrast, as described below, the techniques herein select the most general learning machine model among those computed by different FARs interested in a common problem (e.g., attack detection, performance estimation, etc.). That is, the techniques herein define groups of FARs whose behavior and current conditions allow the sharing of learning machine results. The techniques herein further propose how these learning machines and the behavior data are shared, and describe methods for choosing the model that may replace the local one.

Specifically, according to one or more embodiments of the disclosure, local model parameters are generated by training a machine learning model at a device in a computer network using a local data set. One or more other devices in the network are identified that have trained machine learning models (i.e., that may be identical or different) using remote data sets that are similar to the local data set. The local model parameters are provided to the one or more other devices to cause the one or more other devices to generate performance metrics using the provided model parameters with their local data sets. Performance metrics for model parameters are received from the one or more other devices and a global set of model parameters is selected for the device and the one or more other devices using the received performance metrics.

Operationally, the techniques herein provide a distributed voting mechanism for a set of FARs to select the globally best LM from the locally computed ones. While specific examples of the techniques herein refer to ANNs, these techniques can easily be adapted to other types of learning machines by one skilled in the art (e.g., such as Support Vector Machines (SVMs), etc.). Some potential applications of learning machines in a computer network include, but are not limited to, detection of attacks, estimation of performance, estimation of network parameters, detection of anomalies, etc.

Figure 8A:
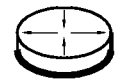
FIGS. 8A-8G illustrate an example mechanism for selecting machine learning model parameters from among across a set of distributed learning machines.
Figure 8A:
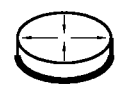
Figure 8A:

FIGS. 8A-8G illustrate an example mechanism for selecting machine learning model parameters from among across a set of distributed learning machines. For example, as shown in FIG. 8A, any number of FARs (e.g., FAR-1, FAR-2, FAR-3, etc.) may each be configured to execute its own machine learning model.

Figure 8B:
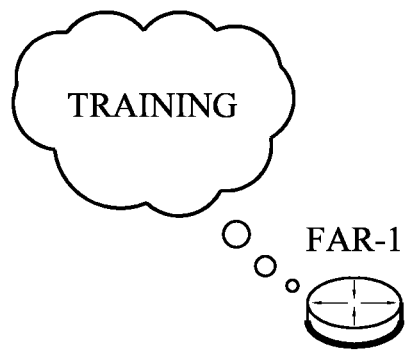
Figure 8B:
Figure 8B:

In a first phase, as shown in the example of FIG. 8B, FAR-1 collects its own data set, composed of observations gathered on all of the nodes in its managed network. For example, data collection may be specifically in the context of attack detection. Once FAR-1 has a sufficiently large set of observations, the training process of the learning machine model is started. After finishing the training process, the FAR is ready to subscribe to a multicast group containing all the FARs that participate in the global choice of LM.

Discovery of FARs Interested in the Global Choice of Model Parameters

Figure 6A:
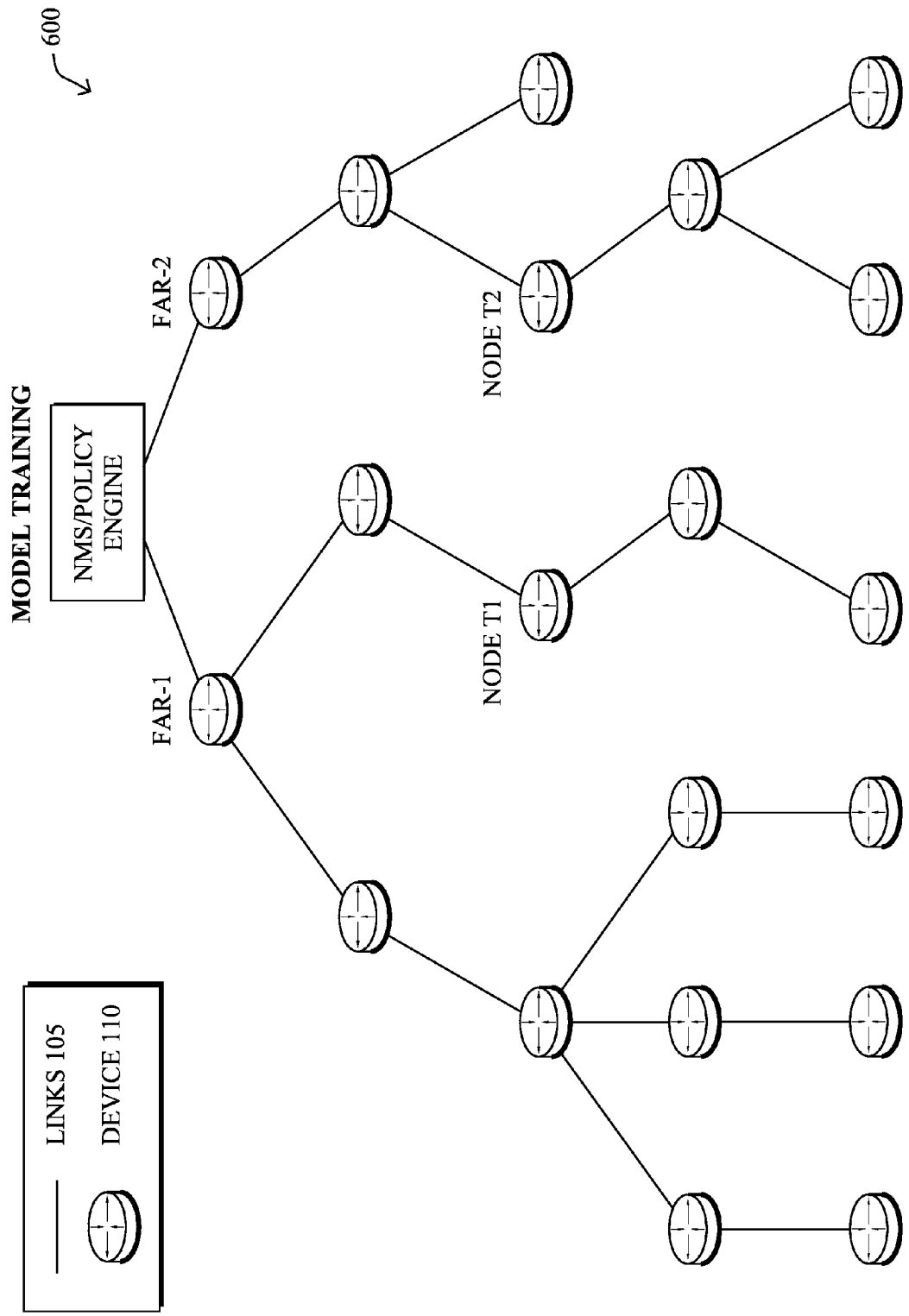
FIGS. 6A-6P illustrate example techniques for training a machine learning model in a computer network.
Figure 6B:
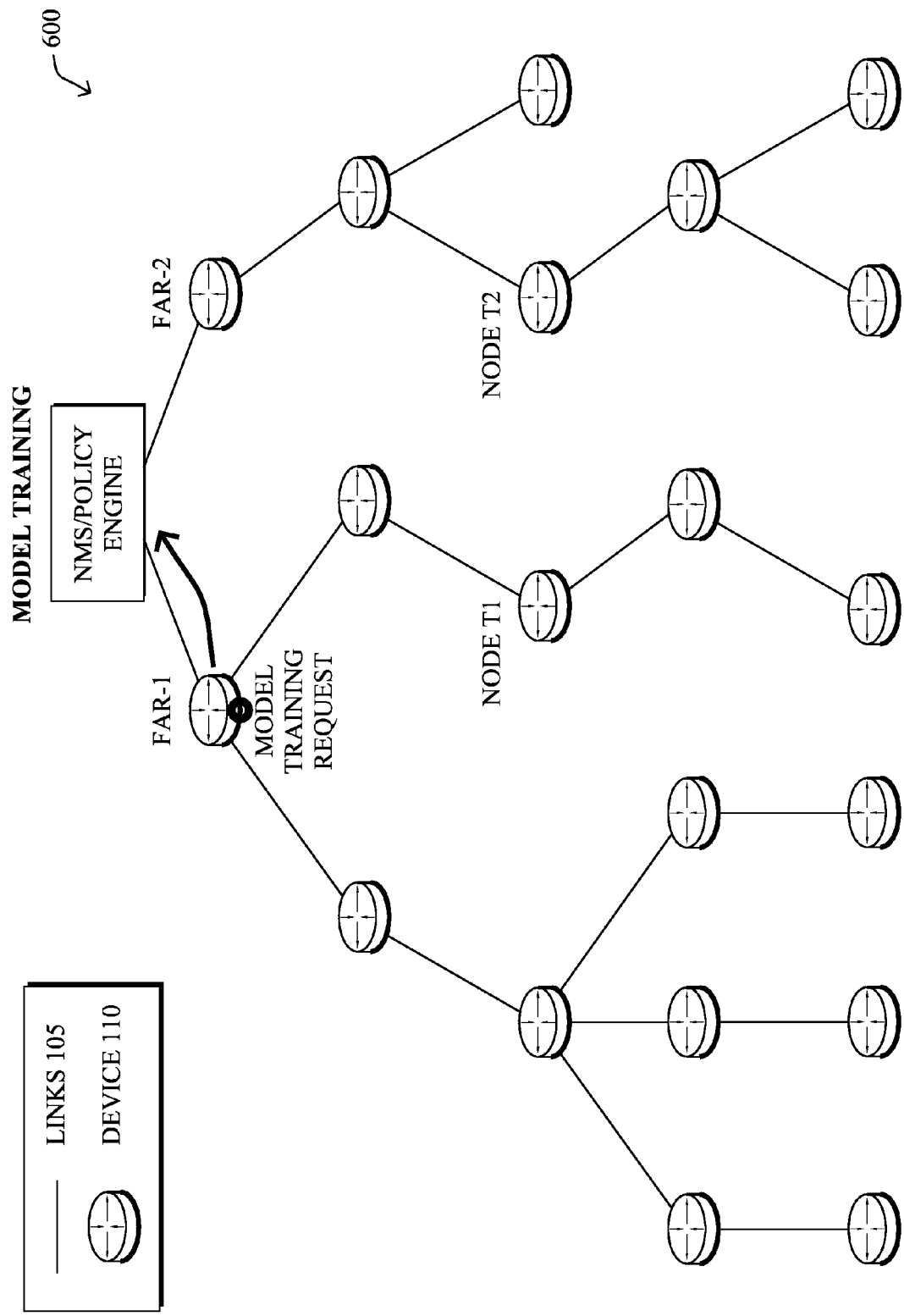
Figure 6C:
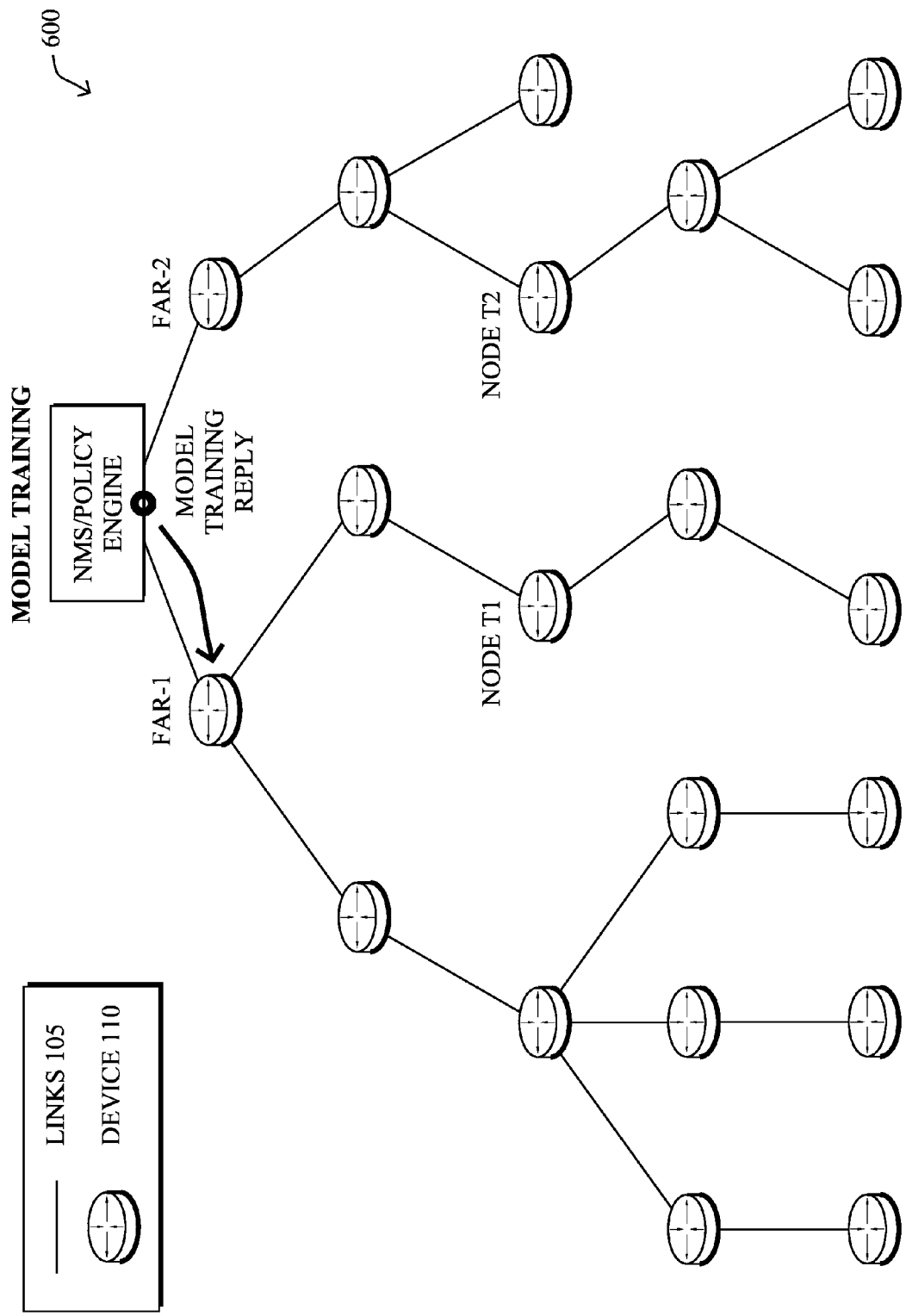
Figure 6D:
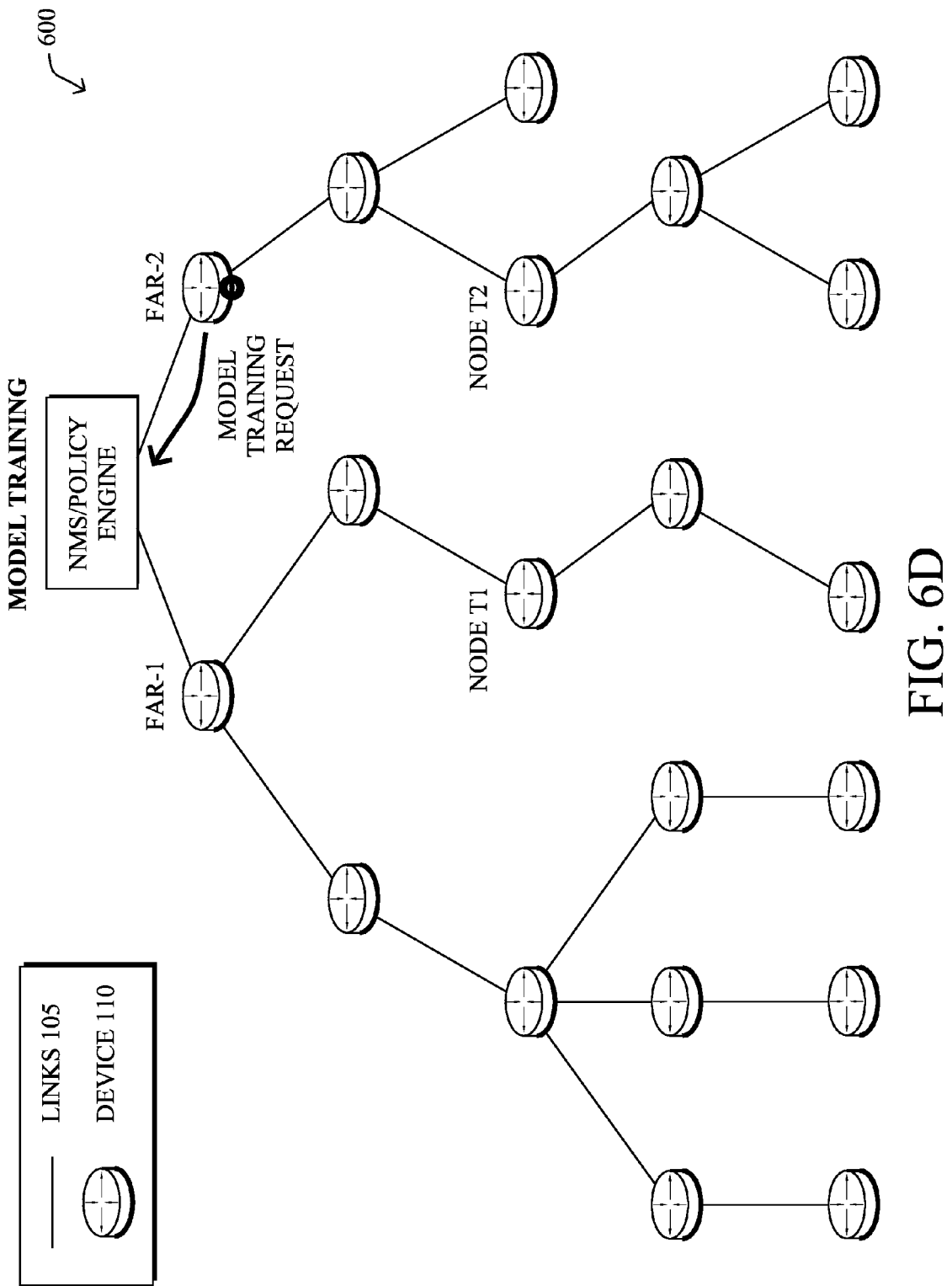
Figure 6E:
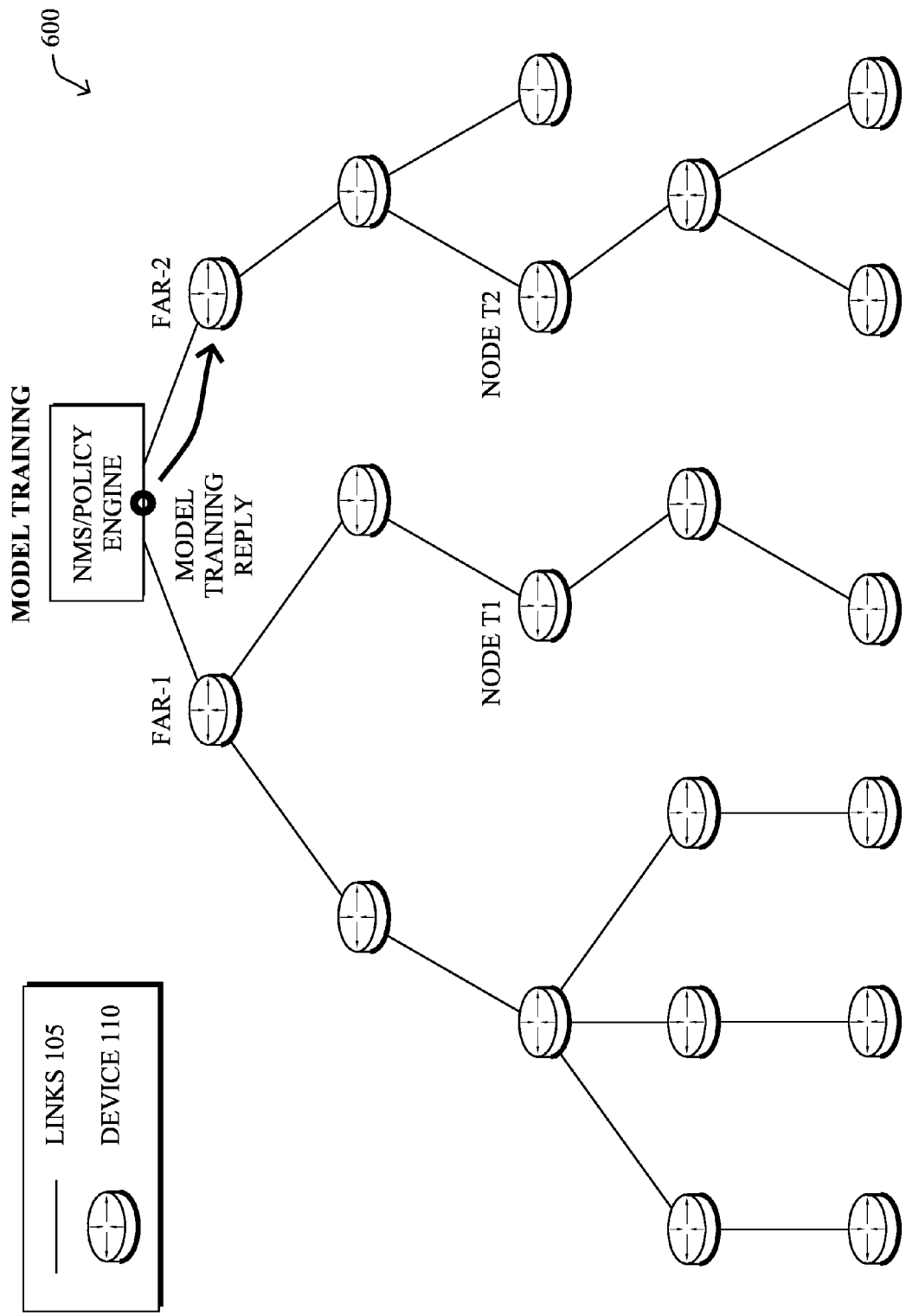
Figure 6F:
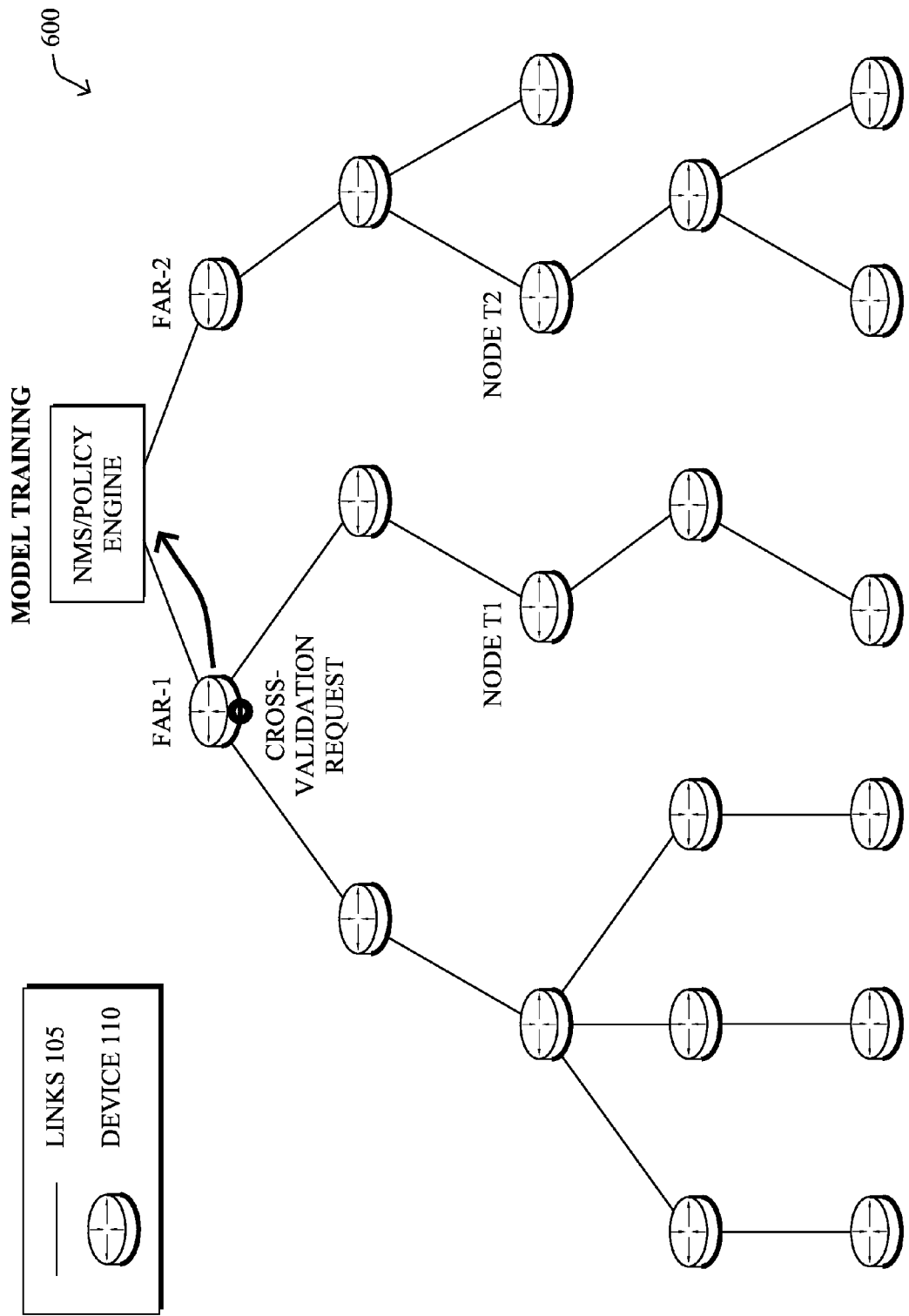
Figure 6G:
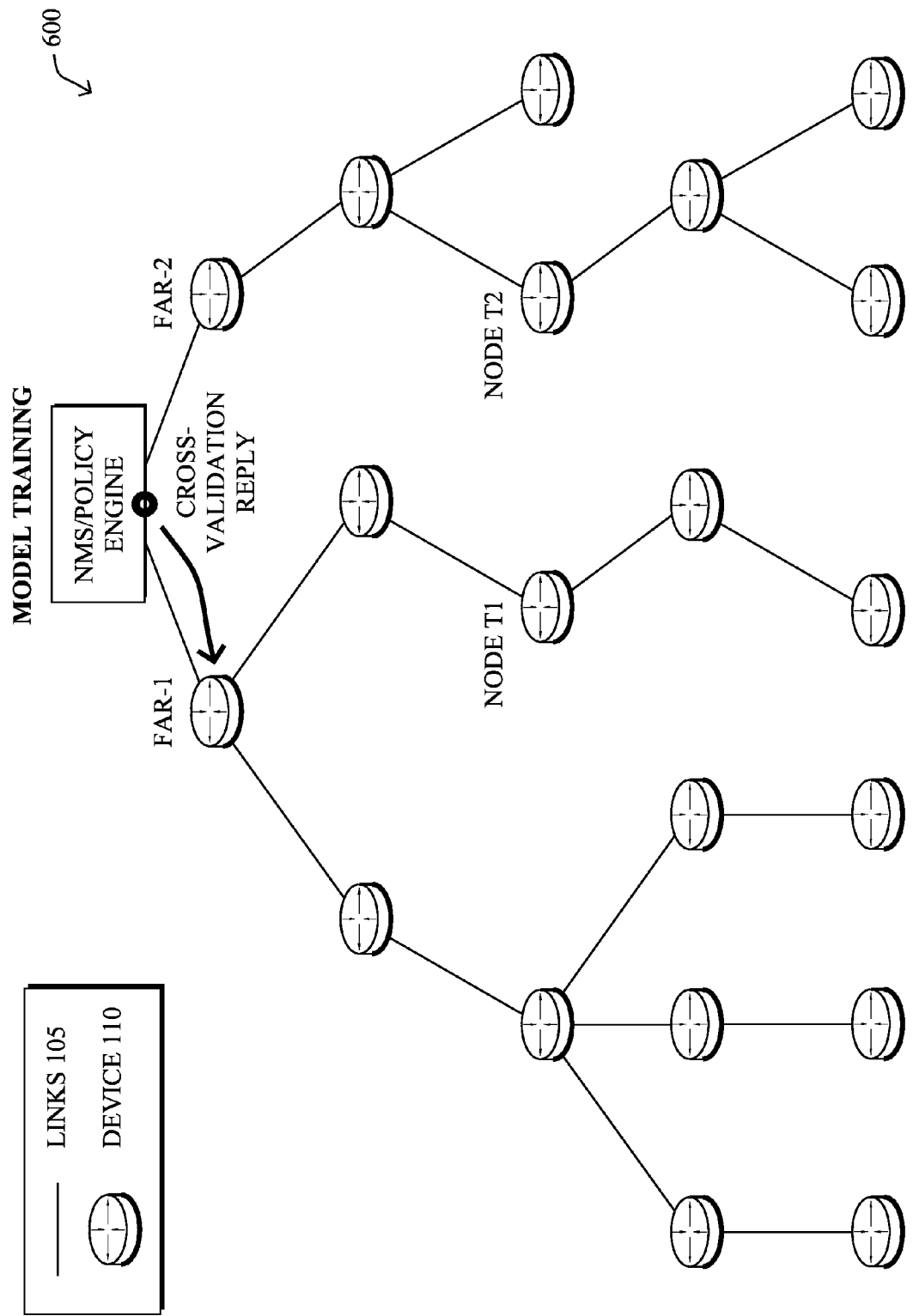
Figure 6H:
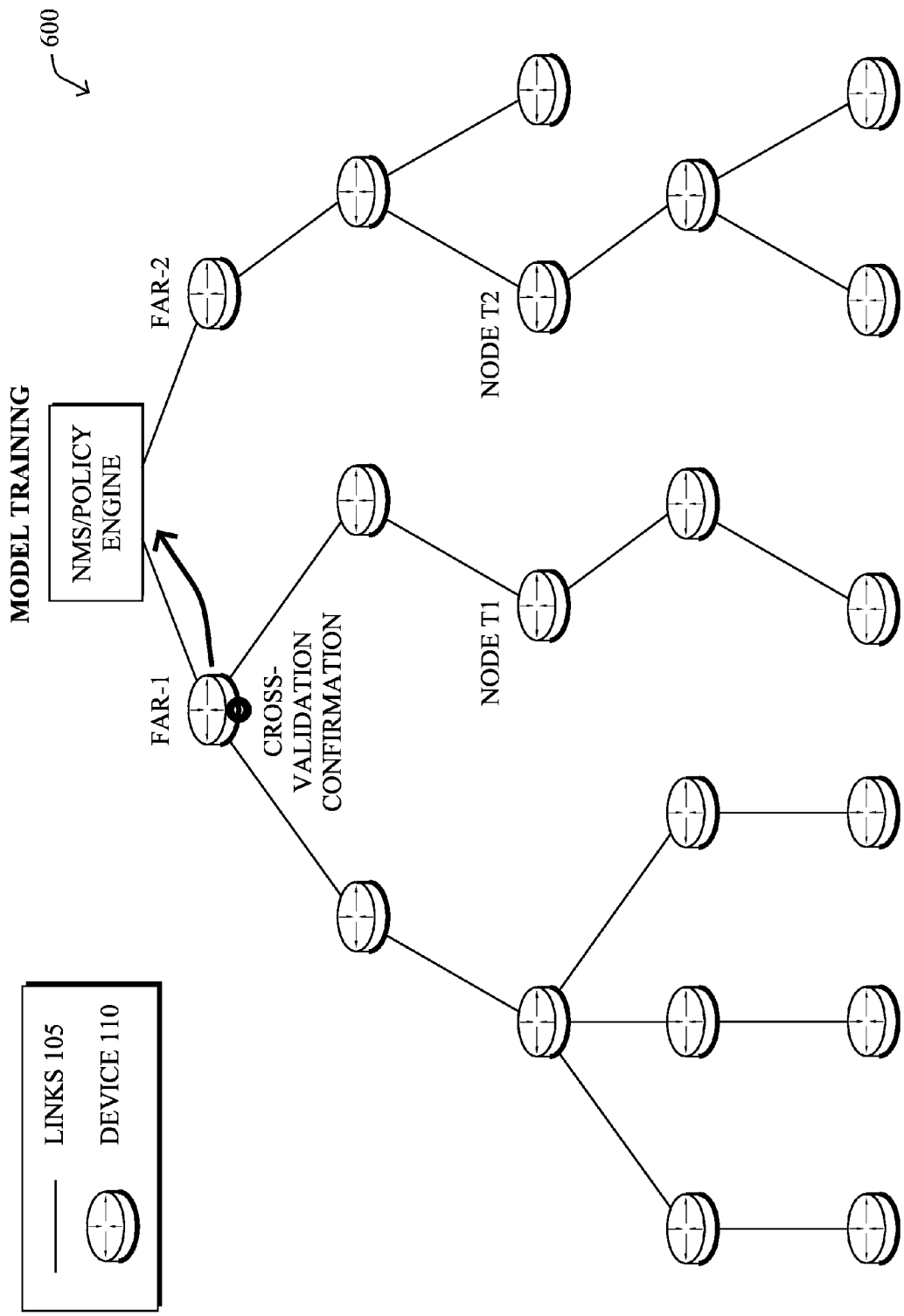
Figure 6I:
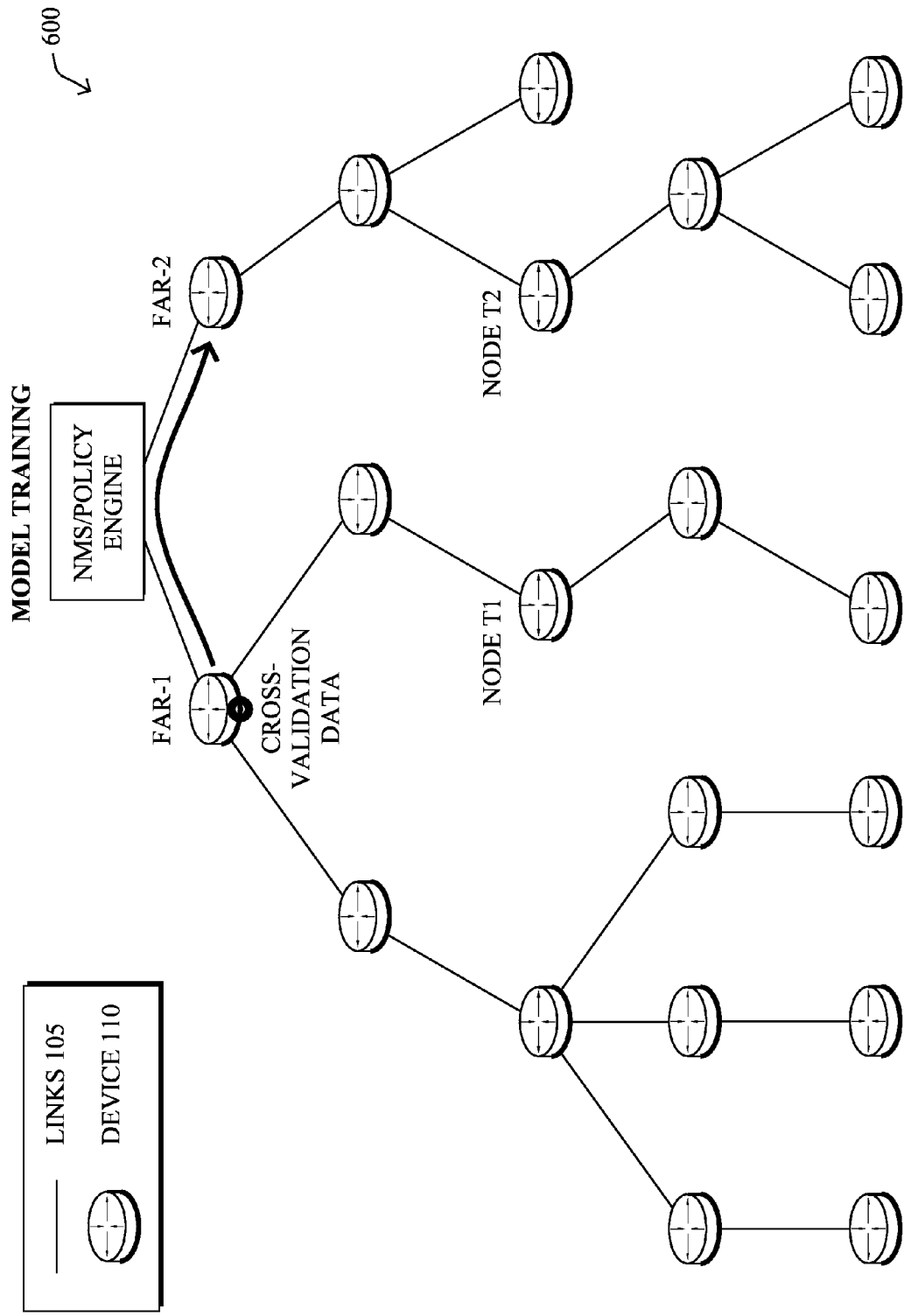
Figure 6J:
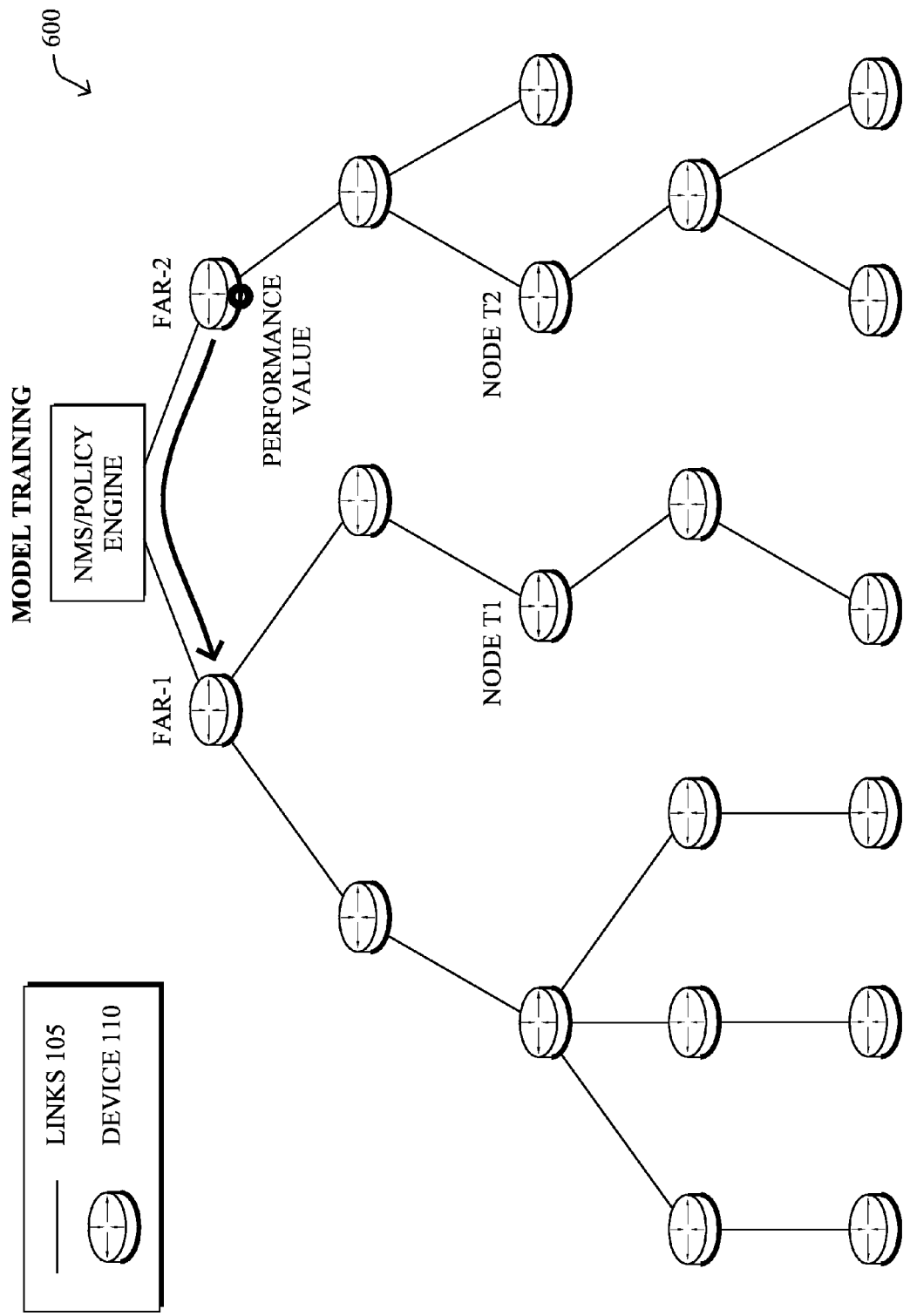
Figure 6K:
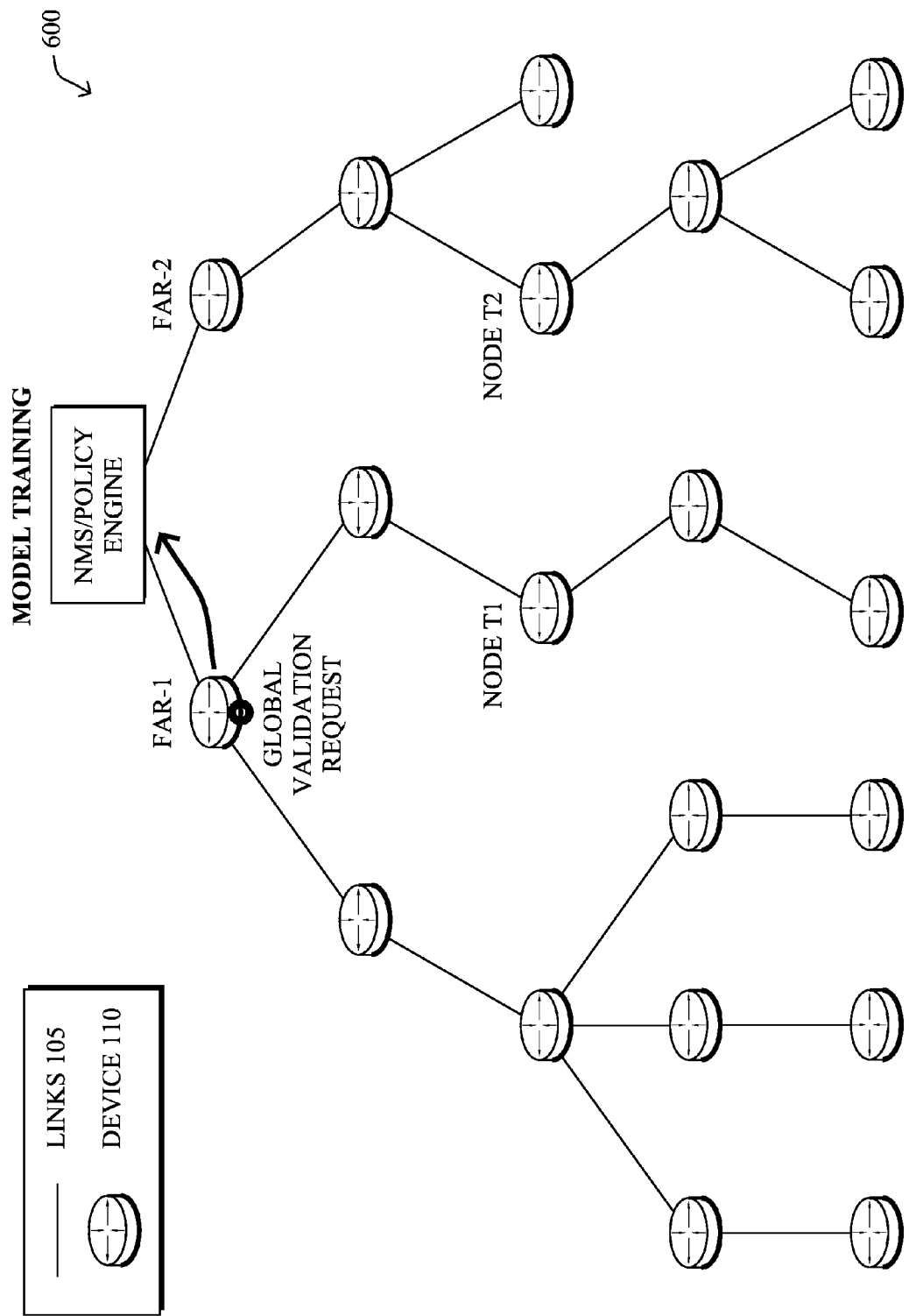
Figure 6L:
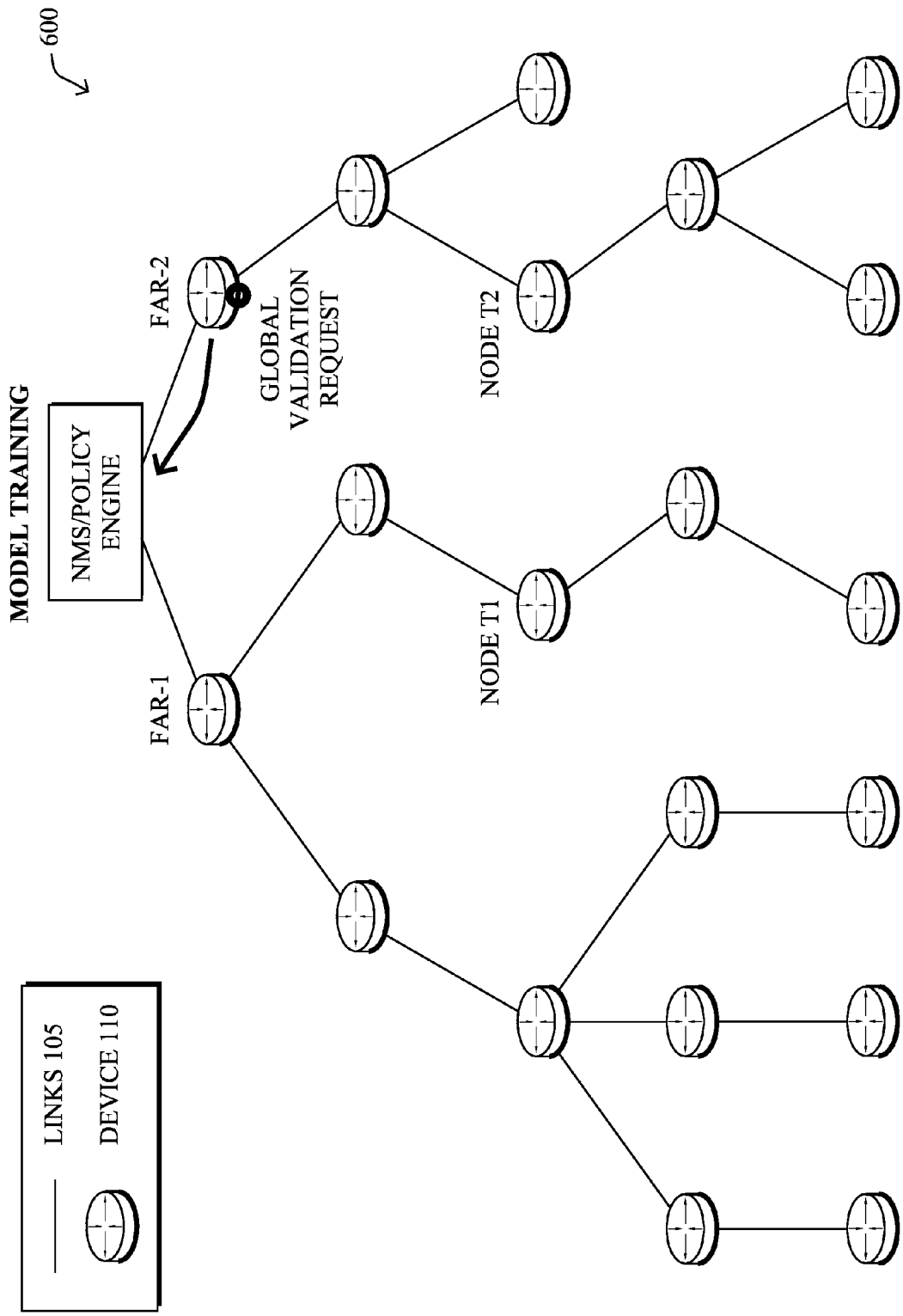

The first component of the particular techniques herein is a discovery mechanism that allows a given FAR to identify FARs hosting learning machines that are collecting similar datasets. For example, a FAR managing a WPAN in a very dense area may be interested in comparing its computed learning machine model with models computed by FARs in a similar scenario. On the contrary, the comparison with FARs located in low-density, rural areas will not be useful for this FAR located in a very dense area. In some embodiments, the techniques herein specify a newly defined GV_Req (Global Validation Request) message, as generally shown in FIGS. 6K-6L, which may be an extension of an also newly defined extension of a CV_Req (Cross Validation Request) message, as generally shown in FIG. 6F. A CV_Req message may be, for example, a newly defined CoAP unicast IPv6 message sent by a Requesting FAR (RF) to the NMS in order to get in return the list of candidate Validation FARs (VFs). For instance, an illustrative CV_Req message may include any or all of the following type-length-values (TLVs):

The inputs for the machine learning model, such as the input features of an ANN (i.e. the data that the input layer of the ANN receives).

Model parameters used in the machine learning model, such as the activation function performed on the neurons in an ANN.

The output of the machine learning model. For example, the outputs of an ANN, which can be a label or group of labels, an estimation of a certain parameter or group of parameters, an estimation of a feature or group of features, etc.

The constraints that have to be applied to the validation data, if any. Indeed, a router can be interested in validating a machine learning model against data responding to certain constraints. For instance, if the RF manages a network with a certain predefined minimum RSSI value, it may be interested in validating its ANN with data satisfying this constraint.

As will be appreciated, the TLVs shown above for a CV_Req message is generic enough to characterize other forms of learning machine models, such as SVMs.

In one embodiment, the newly defined GV_Req (Global Validation Request) message, on the other hand, may contain any or all of the TLVs for a CV_Req message, as detailed above, and any or all of the following additional TLVs:

The characterization of the managed network (e.g., the number of nodes, density, type of applications enabled in the network, etc.).

The characterization of the FAR sending the request (e.g., the hardware resources, traffic levels, etc. of the RF).

A synthetized version of the local data. Several methods can be used for briefly describing local data, which allows tuning the precision and bandwidth trade-off. This description can include a per-feature normalized histogram, multidimensional histograms of features, Principal Components, etc.

The TLVs from the CV_Req message allows the FAR to determine whether its learning machine is compatible with that of other candidates (i.e., whether it can potentially use the peer's learning machine in case it proves to have a better performance). TLVs that characterize the managed network also allow the FAR to assess the similarity of its WPAN to that of other peers. TLVs characterizing the FAR further allow discarding surcharged peers in terms of traffic or computation. Finally, TLVs describing local data may be used in the choice of the best learning machine model.

Figure 6M:
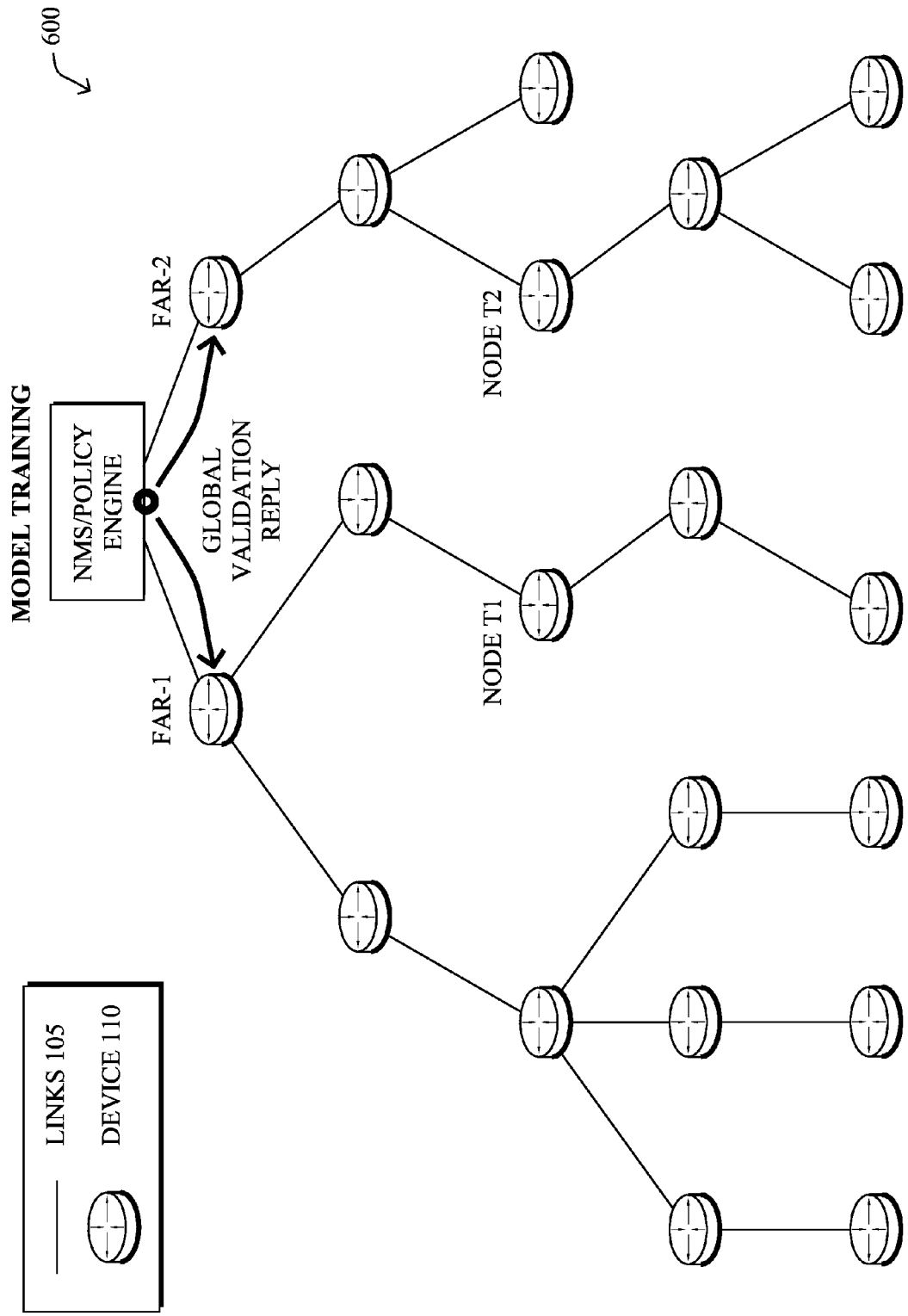
Figure 6N:
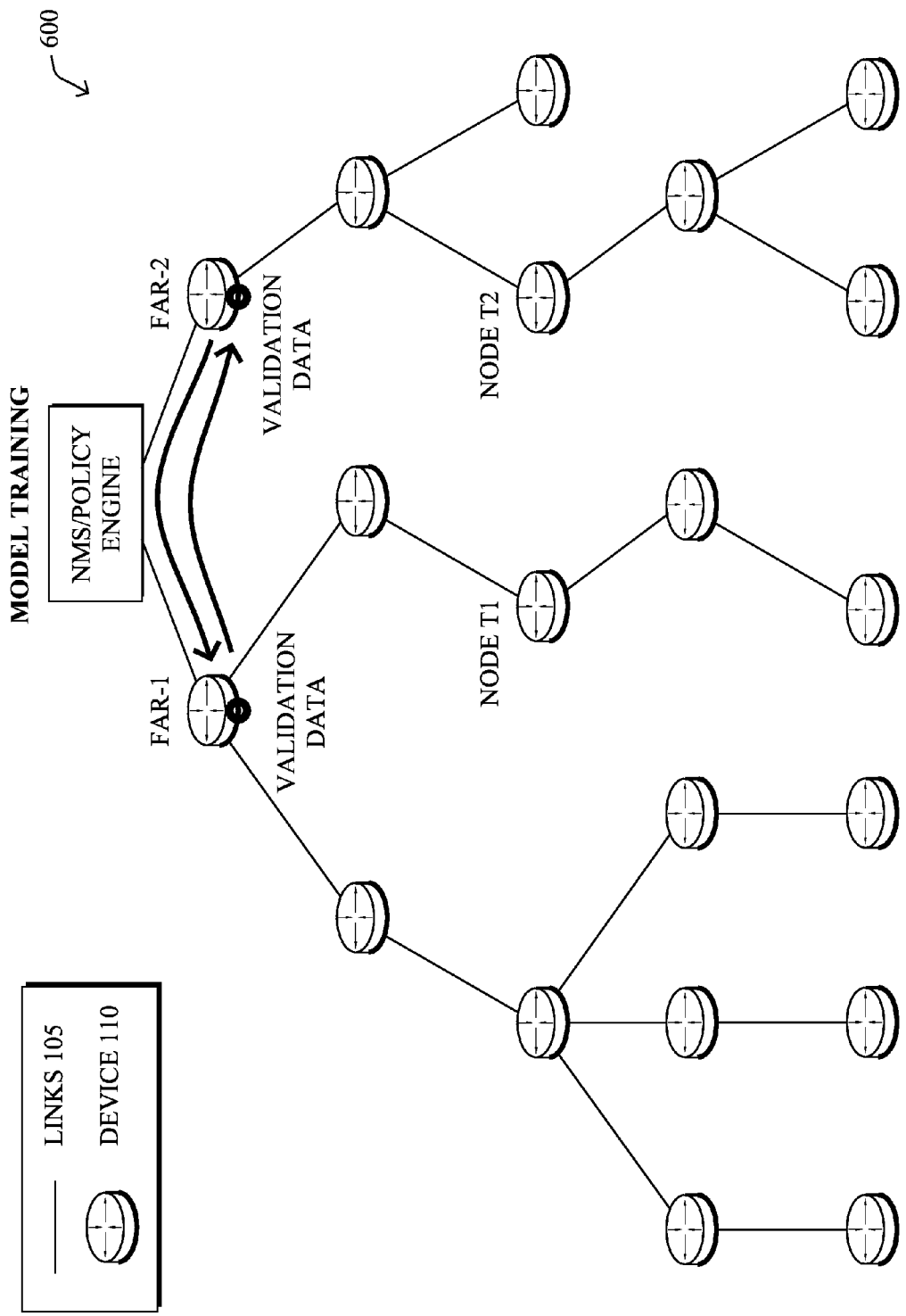
Figure 6O:
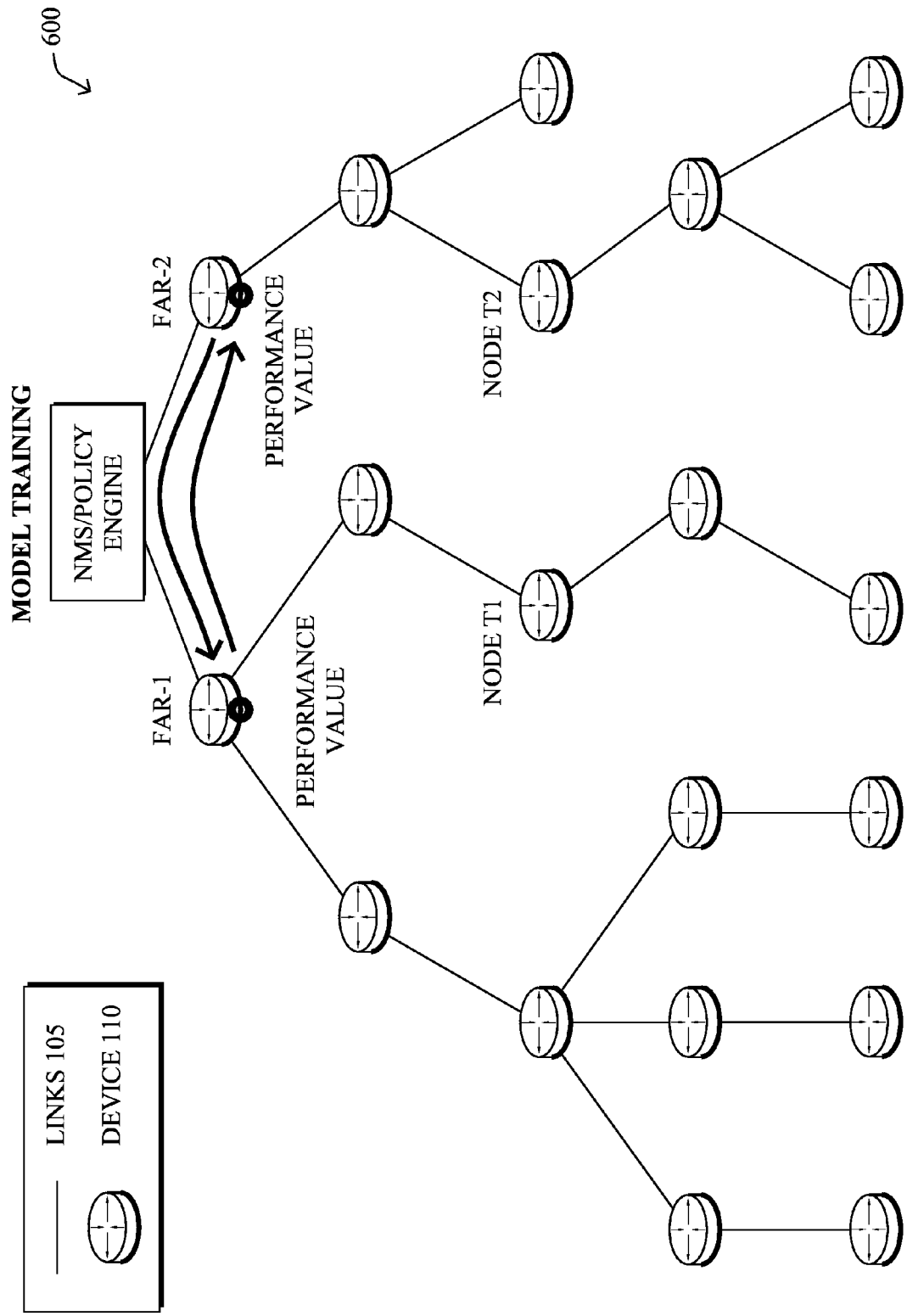
Figure 6P:
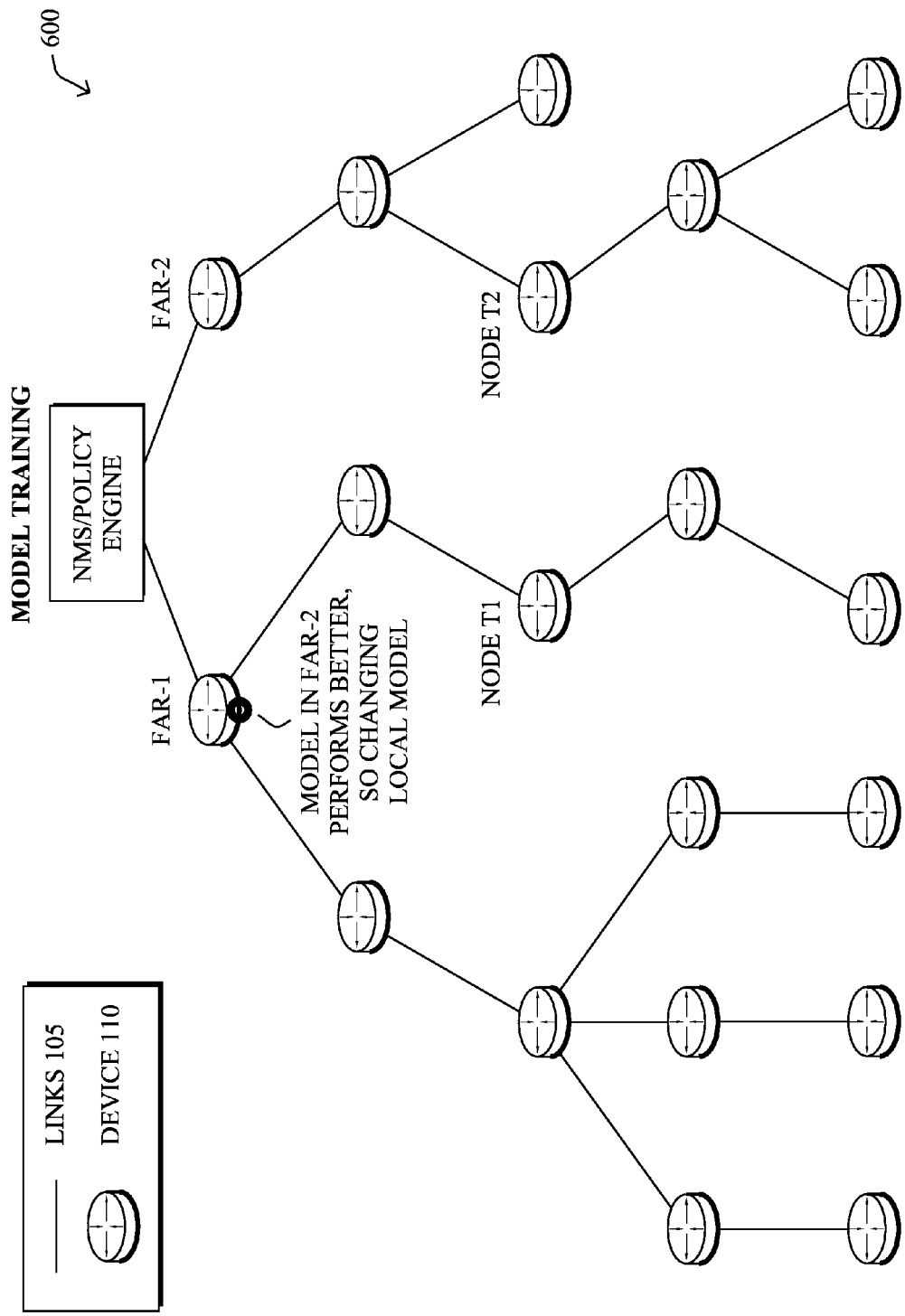
Figure 7A:
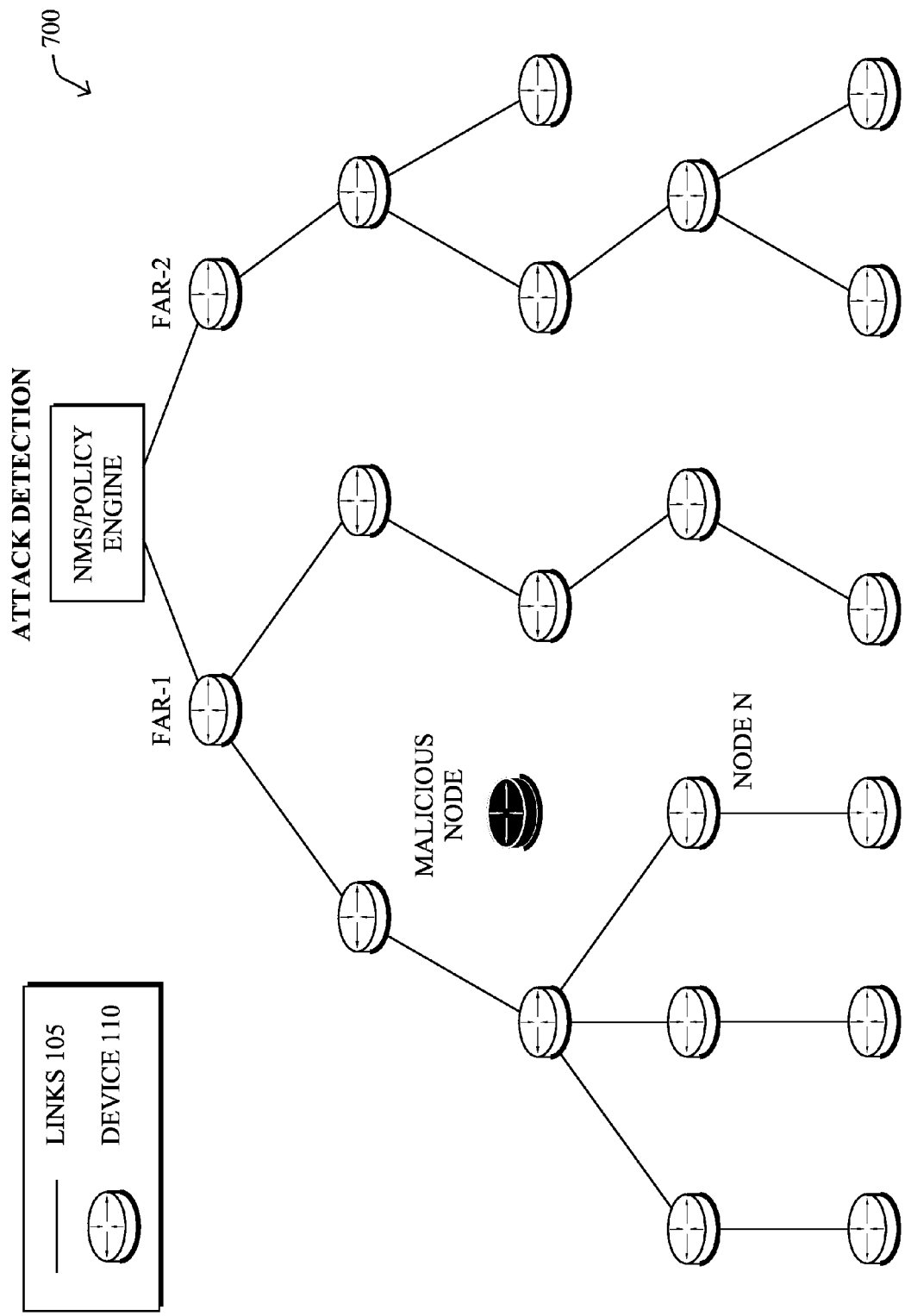
FIGS. 7A-7E illustrate example techniques for using a trained machine learning model to detect a network attack.
Figure 7B:
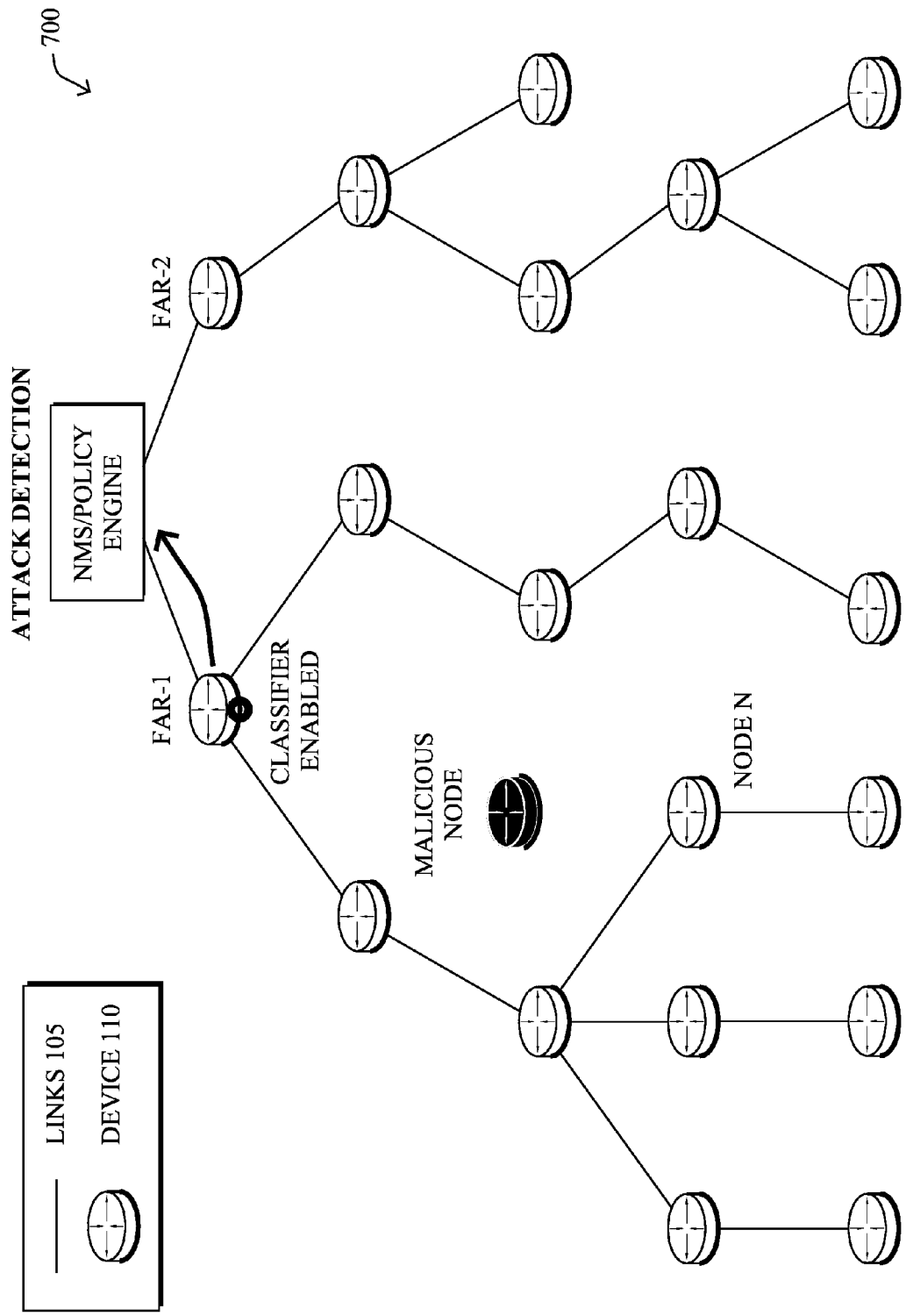
Figure 7C:
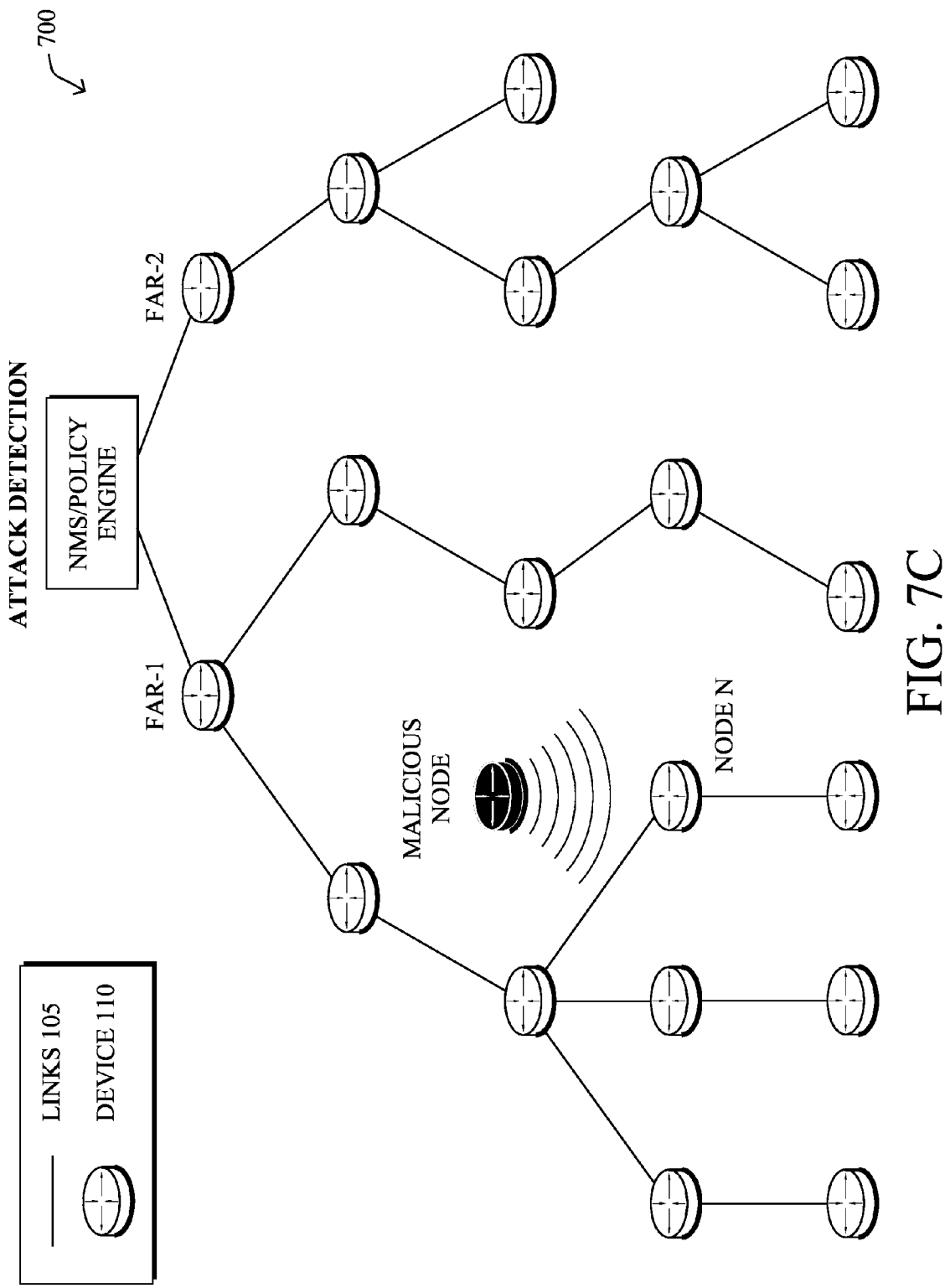
Figure 7D:
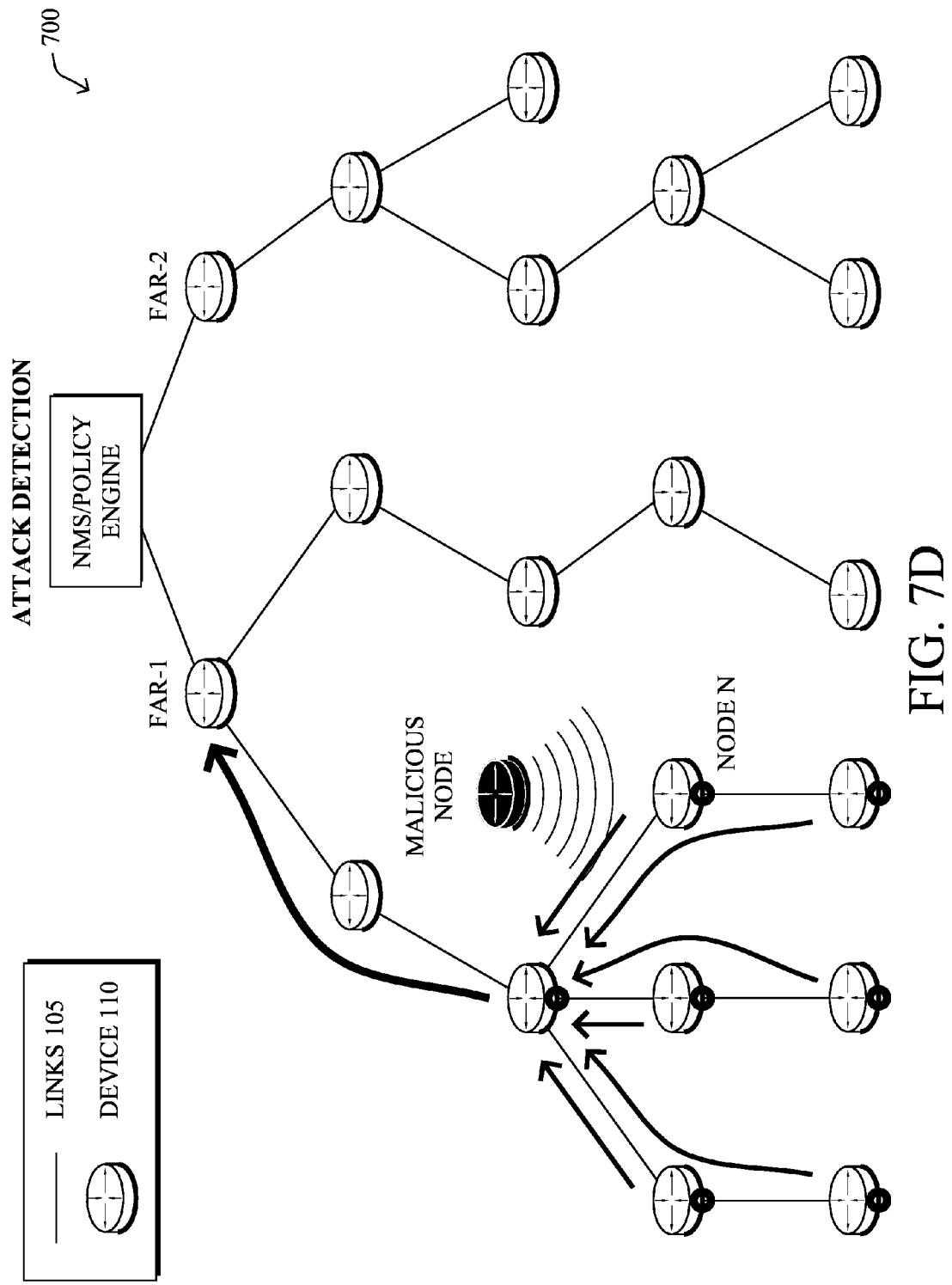
Figure 7E:
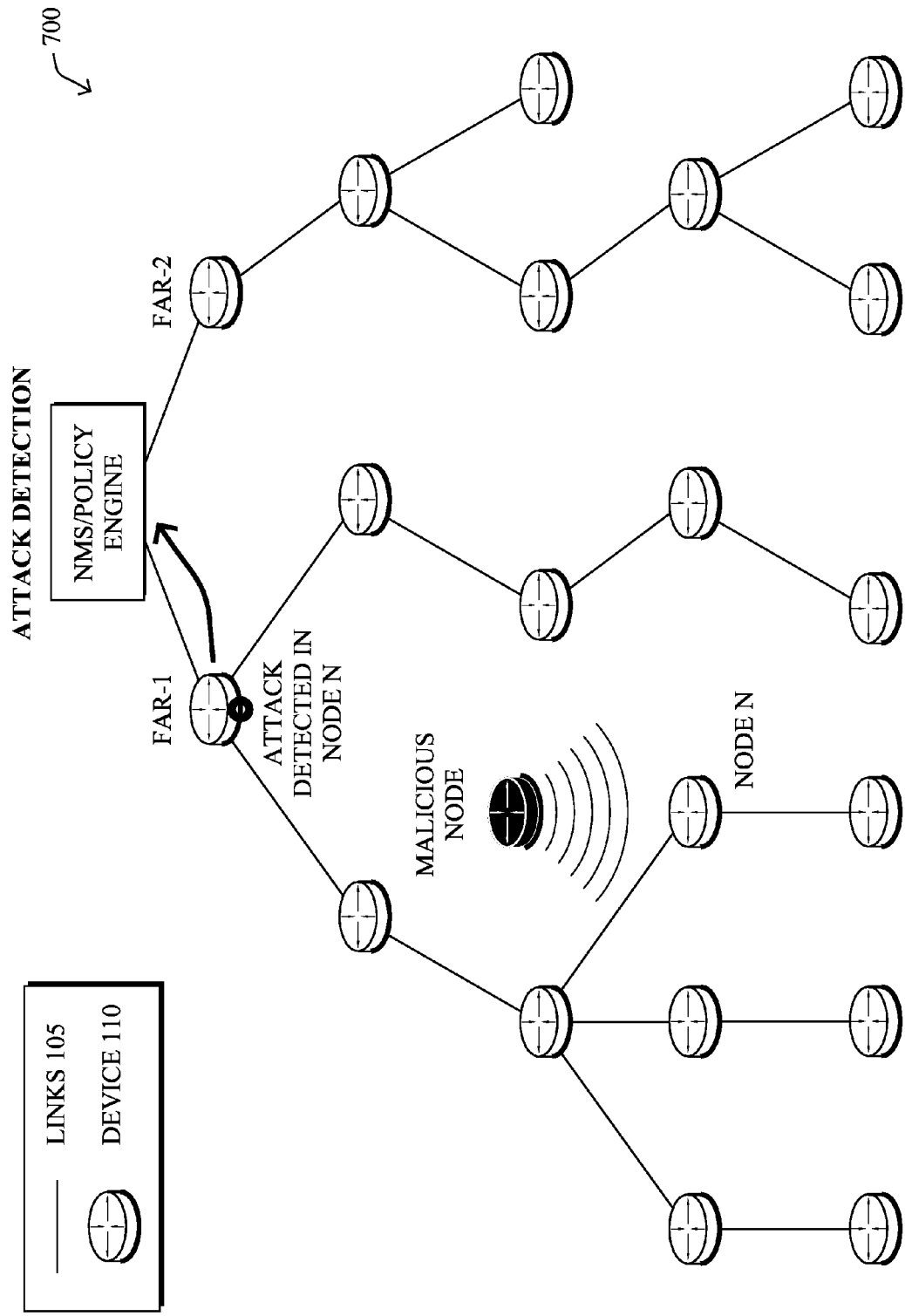

In one embodiment of this component, the FAR sends the GV_Req message to an NMS that manages the global choice of learning machine model parameters (e.g., the NMS address may be learned during the registration process). The NMS then is in charge of collecting all GV_Req messages and configuring multicast groups containing FARs that should collaborate in the global choice of learning machine. Such a multicast group address may be learned upon registration or by using a newly defined CoAP message to each FAR hosting a learning machine. The information about proposed multicast groups may be sent in a GV_Rep (Global Validation Reply) message, as shown in FIG. 6M. The contacted FARs can then choose to join or not join these multicast groups.

In another embodiment, the discovery of FARs interested in the global choice of machine learning model may be distributed and dynamic. In this case, the GV_Req message is instead sent to the multicast group that includes all of the FARs interested in the global choice of the LM.

LM Export

Figure 8C:
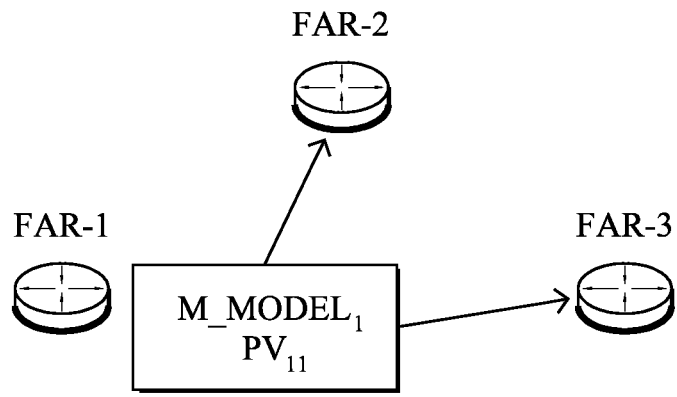

Once the FAR has joined the multicast group used for selection of the most efficient learning machine model, the FAR may export the information describing the learning machine configuration that has been obtained after the local training phase. For example, as shown in FIG. 8C, FAR-1 may export the model parameters for its trained machine learning model to FAR-2, FAR-3, etc. In the case of an ANN, for example, such information will include the connections between neurons and their corresponding weights. More specifically, such information may be a matrix of weights between all neurons called M_ANN (t), the set of weights computed by the FAR at time t. Such data may be included in a specific multicast message. The multicast message may also include one or more performance values (PVs) achieved by the learning machine model on the local dataset, which will be used later in the process as a point of comparison.

Figure 8D:
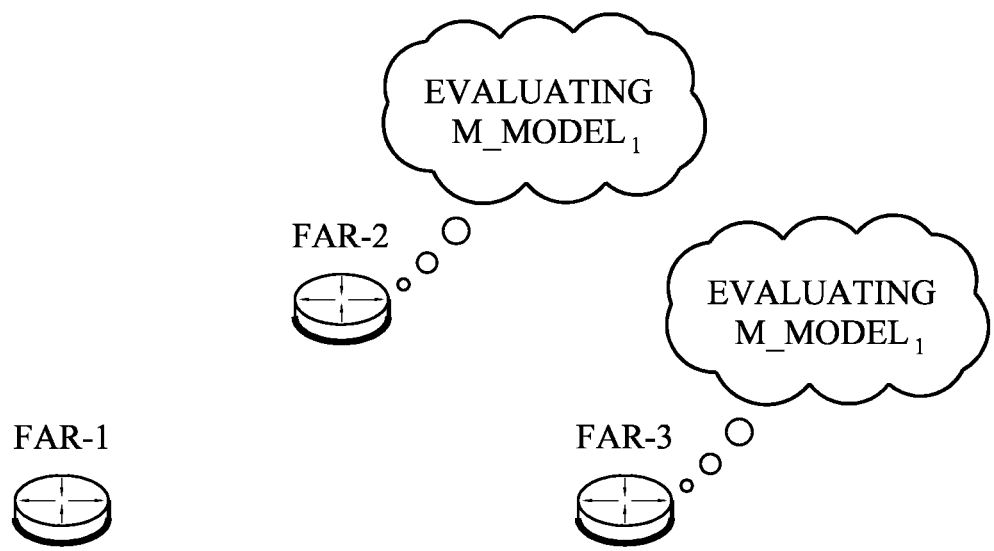

As shown in FIG. 8D, every FAR_j in the multicast group may receive a message containing model parameters from another FAR and instantiates the corresponding learning machine model specified. The FARs may then evaluate the model parameters by computing the performance of the model parameters using their local data sets. In particular, an evaluating FAR may compute a Performance Value $PV_{ij}$, where the indices i,j specify that the performance index was computed by applying the learning machine issued by FAR_i to the data gathered by FAR_j. In one embodiment, a performance value is a vector that includes several performance benchmarks/metrics (e.g., precision and recall, etc.).

Figure 8E:
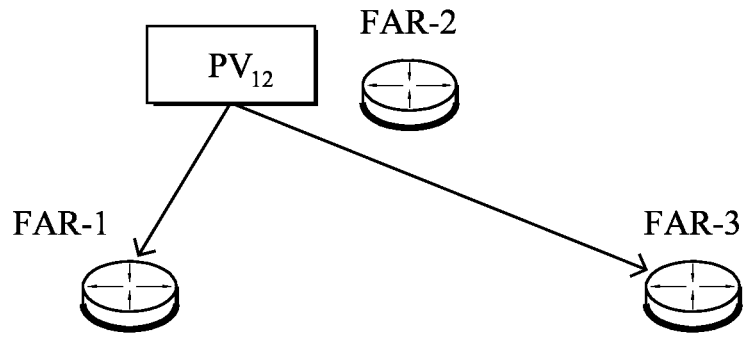
Figure 8F:
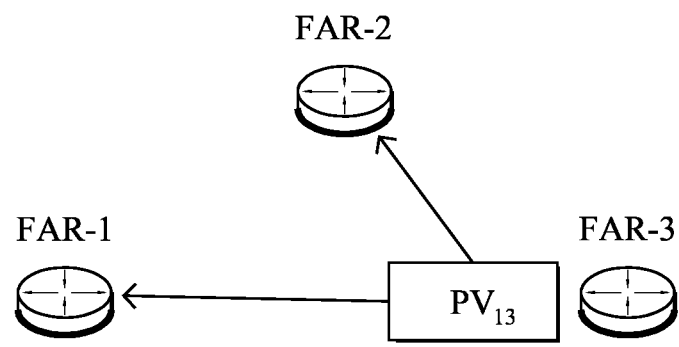
Figure 8G:
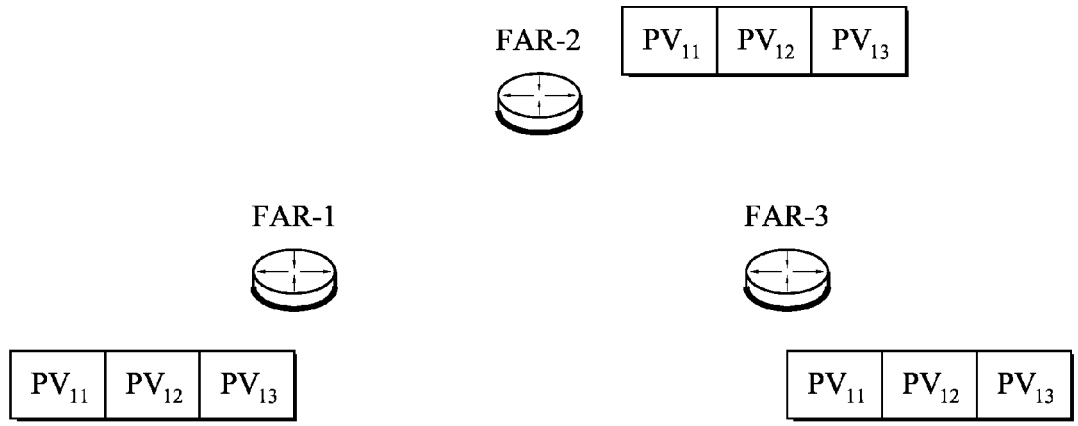

In turn, every FAR_j may send to the multicast group its computed $PV_{ij}$, as shown in the examples of FIGS. 8E-8G. According to various embodiments, the sending of model parameters and calculated performance values may be repeated by each FAR_j. Since each node in the multicast group will receive and store such values, after each FAR in the network has trained its own model parameters and sent them out for validation, a matrix (M_PV) would be available to each member of the multicast group. In particular, each element M_PV(i,j) in the M_PV matrix will correspond to $PV_{ij}$. Accordingly, the diagonal elements of the matrix M_PV will be filled in with the values included by every node in the message describing its own learning machine. In various embodiments, each element of the matrix may either be a scalar, a vector (e.g., precision and recall) or a more complex structure, such as a matrix of performance for a specific learning machine model.

LM Selection

In various embodiments, the next component of the techniques herein is the mechanism by which each device selects the learning machine to use by leveraging the information in M_PV matrix and the collected information about each FAR, as detailed above.

In one embodiment, a FAR may first filter the PV responses from the other FARs. For example, the FAR may remove or ignore all of the results from FARs that reported a PV value on the local dataset that are lower than a minimum predefined threshold T_PV. The filtered list of result is then stored in a modified matrix M_PV'.

At this point, several strategies can be adopted for choosing the best LM, i.e., the learning machine model with the highest BPV (Best Performance Value), according to various embodiments.

In one embodiment, the learning machine model with the highest average performance may be selected. In other words, the parameters for the global model with the highest value of $BPV=(1/N)*(PV\_i1+PV\_i2+ \ldots +PV\_iN)$ may be selected, where N is the number of FARs whose performances are reported in M_PV'.

In another embodiment, the model with the highest weighted average performance may be selected as the global model. In this case, $BPV=(1/S)*(s_{i1}*PV_{i1}+s_{i2}*PV_{i2}+ \ldots +s_{iN}*PV_{iN})$, where $S=s_{i1}+s_{i2}+ \ldots +s_{iN}$. The values of $s_{ij}$ are computed using a similarity measure between the scenarios of the different FARs with respect to the local FAR. Several methods can be used for computing $s_{ij}$, in various embodiments, ranging from computing the ratio between the number of nodes to computing a distance between histograms of features. Of note is that the first option corresponds to a particular case of the second, where each $s_{ij}$ is fixed to 1.

In a further embodiment, the model that performs better than the others the highest number of times may be chosen as the global model. In other words, BPV contains a number indicating in how many FARs this model performed better than all the other models.

Figure 9:
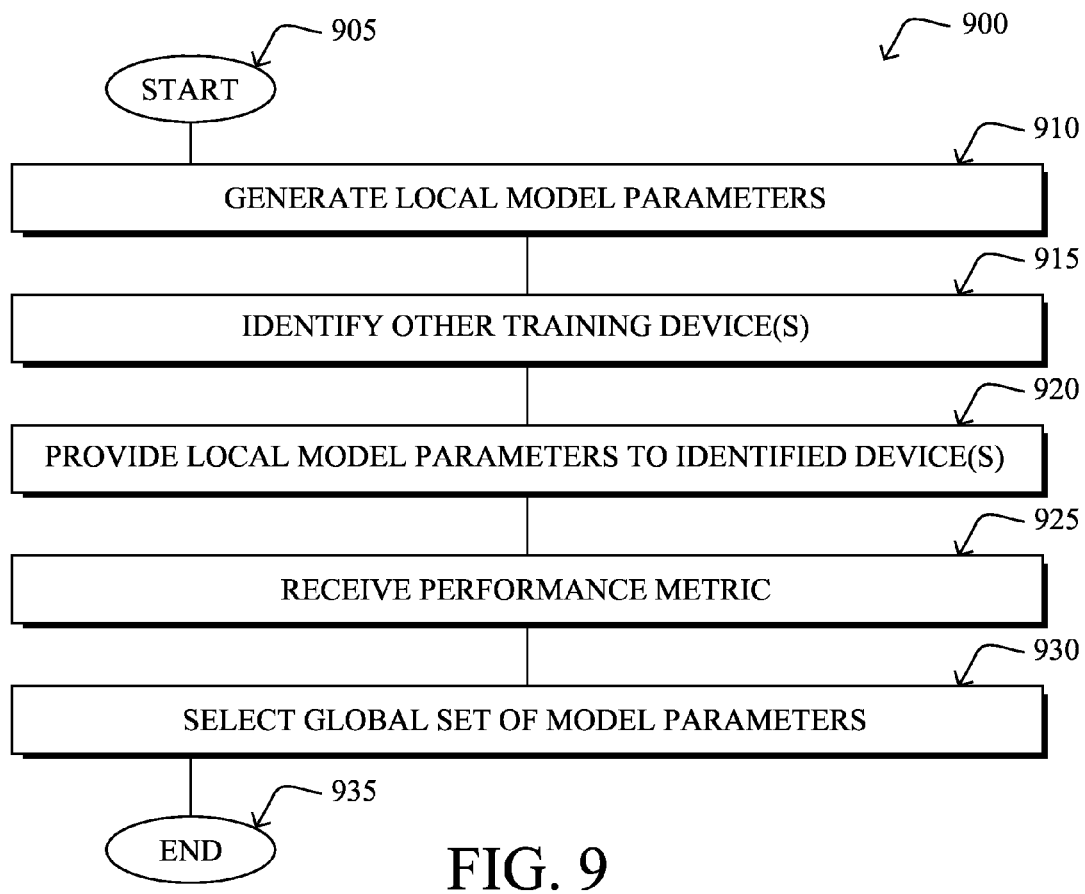
FIG. 9 illustrates an example simplified procedure for selecting a global set of machine learning model parameters.

FIG. 9 illustrates a simplified procedure for selecting a global set of machine learning model parameters, in accordance with embodiments herein. Procedure 900 begins at step 905 and continues on to step 910 where, as described in greater detail above, parameters for a machine learning model are generated locally by a network node/device (e.g., by training the model using locally collected data). In step 915, one or more other training devices are identified, as detailed above. Procedure 900 then continues on to step 920 in which the local model parameters are provided to the other identified training device or devices. In response, the training devices may generate performance metrics using the model parameters with data sets that are collected locally by the other training devices. In step 925, performance metrics are received from the other training devices. As highlighted in more detail above, the received performance metrics may include metrics for the locally generated model parameters and/or for model parameters generated by any of the other training devices. In step 930, a global set of model parameters are then selected for the devices based on the received performance metrics and procedure 900 ends at step 935.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

Illustratively, each of the techniques described herein may be performed by hardware, software, and/or firmware, such as in accordance with the learning machine process 248, which may contain computer executable instructions executed by the processor 220 (or independent processor of interfaces 210) to perform functions relating to the techniques described herein, e.g., optionally in conjunction with other processes. For example, certain aspects of the techniques herein may be treated as extensions to conventional protocols, such as the various communication protocols (e.g., routing process 244), and as such, may be processed by similar components understood in the art that execute those protocols, accordingly. Also, while certain aspects of the techniques herein may be described from the perspective of a single node/device, embodiments described herein may be performed as distributed intelligence, also referred to as edge/distributed computing, such as hosting intelligence within nodes 110 of a Field Area Network in addition to or as an alternative to hosting intelligence within servers 150.

The techniques described herein, therefore, provide for a distributed mechanism for high speed learning and optimal computing across a set of distributed learning machines (e.g., ANNs, SVMs, etc.). In particular, these techniques allow a set of FARs to improve a learning machine used for network analysis, such as security related analysis. The techniques also allow the lack of significant trace of a subset of phenomena in the data set of a specific FAR to be overcome.

While there have been shown and described illustrative embodiments that provide for computer network anomaly training and detection using artificial neural networks, generally, it is to be understood that various other adaptations and modifications may be made within the spirit and scope of the embodiments herein. For example, the embodiments have been shown and described herein with relation to LLNs and related protocols. However, the embodiments in their broader sense are not as limited, and may, in fact, be used with other types of communication networks and/or protocols. In addition, while the embodiments have been shown and described with relation to learning machines in the specific context of communication networks, certain techniques and/or certain aspects of the techniques may apply to learning machines in general without the need for relation to communication networks, as will be understood by those skilled in the art.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    generating local model parameters by training a machine learning model at a device in a computer network using a local data set;
    identifying, at the device, one or more other devices in the network that have trained machine learning models using remote data sets that are similar to the local data set;
    transmitting, by the device, the local model parameters to the one or more other devices to cause the one or more other devices to generate performance metrics using the transmitted model parameters:
    receiving, at the device, the performance metrics from the one or more other devices;
    receiving, at the device, model parameters from the one or more other devices that were generated by the one or more other devices training one or more other machine learning models;
    using, by the device, the received model parameters with the local data set to generate local performance metrics;
    comparing, by the device, the local performance metrics with the performance metrics received from the one or more other devices to select a global set of model parameters;
    selecting, by the device, the global set of model parameters for the device and the one or more other devices based on the comparison between the local performance metrics and the received performance metrics; and
    selecting, by the device, the model parameters having the highest average performance metrics as the global set of model parameters.

2. The method as in claim 1, wherein the machine learning model trained by the device is an artificial neural network (ANN) and the trained parameters comprise weighted links between neurons in the ANN.

3. The method as in claim 1, wherein identifying the one or more other devices comprises: sending an identification request to a network management service (NMS).

4. The method as in claim 1, wherein identifying the one or more other devices comprises: multicasting identification requests to the one or more other devices.

5. The method as in claim 1, wherein the highest average performance metrics are the highest weighted average performance metrics.

6. The method as in claim 1, further comprising: selecting the model parameters that performed best on the highest number of devices as the global set of model parameters.

7. The method as in claim 1, wherein the machine learning model is configured to determine a model output selected from a group comprising: a detected network attack, a detected network anomaly, or an estimated network parameter.

8. The method as in claim 1, further comprising:
    receiving an identification request from a remote network device that comprises data regarding the remote network device and devices managed by the remote network device;
    determining that the remote network device uses a data set that is similar to the local data set based on the identification request; and
    notifying the remote network device that the remote network devices uses a similar data set.

9. The method as in claim 8, wherein the data regarding the remote network device is selected from the group comprising: hardware resources of the remote network device and traffic levels of the remote network device.

10. The method as in claim 8, wherein the data regarding the devices managed by the remote network device is selected from the group comprising: the number of managed devices, the density of managed devices, or the types of applications executed by the managed devices.

11. An apparatus, comprising:
    one or more network interfaces to communicate in a computer network;
    a processor coupled to the network interfaces and configured to execute one or more processes; and
    a memory configured to store a process executable by the processor, the process when executed operable to:
    generate local model parameters by training a machine learning model using a local data set;
    identify one or more other devices that have trained machine learning models using remote data sets that are similar to the local data set;
    transmit the local model parameters to the one or more other devices to cause the one or more other devices to generate performance metrics using the transmitted model parameters;
    receive the performance metrics from the one or more other devices;
    receive model parameters from the one or more other devices that were generated by the one or more other devices training one or more other machine learning models:
    use the received model parameters with the local data set to generate local performance metrics;
    compare the local performance metrics with the performance metrics received from the one or more other devices to select a global set of model parameters;
    select the global set of model parameters for the device and the one or more other devices based on the comparison between the local performance metrics and the received performance metrics; and select the model parameters having the highest average performance metrics as the global set of model parameters.

12. The apparatus as in claim 11, wherein the machine learning model trained by the device is an artificial neural network (ANN) and the trained parameters comprise weighted links between neurons in the ANN.

13. The apparatus as in claim 11, wherein the machine learning model is configured to determine a model output selected from a group comprising: a detected network attack, a detected network anomaly, or an estimated network parameter.

14. The apparatus as in claim 11, wherein the process when executed is further operable to: multicast identification requests to the one or more other devices.

15. The apparatus as in claim 11, wherein the process when executed is further operable to:
generate performance metrics using the local data set with the local model parameters; and
transmitting the generated performance metrics using the local model parameters to the one or more other devices.

16. A tangible, non-transitory, computer-readable media having software encoded thereon, the software when executed by a processor operable to:
generate local model parameters by training a machine learning model using a local data set;
identify, for the device, one or more other devices that have trained machine learning models using remote data sets that are similar to the local data set;
transmit, for the device, the local model parameters to the one or more other devices to cause the one or more other devices to generate performance metrics using the transmitted model parameters;
receive, at the device, the performance metrics from the one or more other devices;
receive model parameters from the one or more other devices that were generated by the one or more other devices training one or more other machine learning models;
use the received model parameters with the local data set to generate local performance metrics
compare the local performance metrics with the performance metrics received from the one or more other devices to select a global set of model parameters:
select the global set of model parameters for the device and the one or more other devices based on the comparison between the local performance metrics and the received performance metrics: and
select the model parameters having the highest average performance metrics as the global set of model parameters.

* * * * *